(12) United States Patent
Naito et al.

(10) Patent No.: US 8,904,121 B2
(45) Date of Patent: Dec. 2, 2014

(54) COMPUTER SYSTEM AND STORAGE MANAGEMENT METHOD

(75) Inventors: Anna Naito, Machida (JP); Wataru Okada, Yokohama (JP); Hirokazu Ikeda, Yamato (JP)

(73) Assignee: Hitachi, Ltd., Tokyo (JP)

( * ) Notice: Subject to any disclaimer, the term of this patent is extended or adjusted under 35 U.S.C. 154(b) by 531 days.

(21) Appl. No.: 13/263,285

(22) PCT Filed: Sep. 22, 2011

(86) PCT No.: PCT/JP2011/005355
§ 371 (c)(1),
(2), (4) Date: Oct. 6, 2011

(87) PCT Pub. No.: WO2013/042174
PCT Pub. Date: Mar. 28, 2013

(65) Prior Publication Data
US 2013/0080727 A1    Mar. 28, 2013

(51) Int. Cl.
*G06F 13/00*  (2006.01)
*G06F 3/06*  (2006.01)
*G06F 13/16*  (2006.01)
*G06F 13/12*  (2006.01)

(52) U.S. Cl.
CPC .............. *G06F 3/061* (2013.01); *G06F 13/161* (2013.01); *G06F 13/122* (2013.01); *G06F 3/0631* (2013.01); *G06F 3/0665* (2013.01); *G06F 3/0685* (2013.01)
USPC ............... 711/156; 711/117; 710/58; 710/64; 710/120

(58) Field of Classification Search
CPC ...... G06F 3/061; G06F 13/122; G06F 13/161
USPC ........................ 711/117, 156; 710/58, 64, 120
See application file for complete search history.

(56) References Cited

U.S. PATENT DOCUMENTS 8,447,941 B2 * 5/2013 Kono et al. .................... 711/162
2005/0154821 A1 * 7/2005 Furuhashi et al. ............ 711/112
(Continued)

FOREIGN PATENT DOCUMENTS

EP  2 302 500 A2  3/2011
EP  2 378 427 A1  10/2011
(Continued)

OTHER PUBLICATIONS

PCT International Search Report and Written Opinion on application PCT/JP2011/005355 mailed Mar. 7, 2012; 13 pgs.

*Primary Examiner* — Rebi I Elmore
(74) *Attorney, Agent, or Firm* — Foley & Lardner LLP

(57) ABSTRACT

A storage tiered that satisfies desired performance is configured by recognizing the type and capacity of storage media of a storage apparatus, which are held by a user, and using the storage media.

When adding a specified area of storage media to a storage tiered in response to a request from a host computer, a management computer: obtains storage media information, including I/O frequency of a data storage area of a volume(s) as well as performance information and structure information of the storage media, from the storage apparatus; identifies one or more storage media, which have not been allocated to any of the volumes with the I/O performance in excess of the I/O frequency, on the basis of the structure information of the storage media so that the data storage area of the volume(s), to which a specified storage in the storage tiered is allocated, would achieve a specified I/O performance target; and issues an instruction to the storage apparatus to create a storage tiered by using the identified storage media.

18 Claims, 33 Drawing Sheets

(56) References Cited

U.S. PATENT DOCUMENTS

| | | |
|---|---|---|
| 2008/0082777 A1 | 4/2008 | Sakaguchi et al. |
| 2009/0300285 A1 | 12/2009 | Nagai et al. |
| 2010/0115222 A1* | 5/2010 | Usami .......................... 711/170 |
| 2011/0252214 A1 | 10/2011 | Naganuma et al. |
| 2011/0283062 A1* | 11/2011 | Kumagai et al. ............. 711/114 |
| 2011/0320733 A1* | 12/2011 | Sanford et al. ............... 711/135 |

FOREIGN PATENT DOCUMENTS

| | | |
|---|---|---|
| JP | 2007-066259 | 3/2007 |
| WO | WO 2011/092739 A1 | 8/2011 |

* cited by examiner

FIG.5

| TIER ORDER | STORAGE MEDIA TYPE | CAPACITY [GB] | IOPS LIMIT | USE AUTHORITY |
|---|---|---|---|---|
| 1 | SSD | 20 | 5000 | USER A USER B |
| 2 | SAS15K | 30 | 3500 | USER A |
| 2 | SAS15K | 20 | 3500 | USER B |
| 2 | SAS15K | 10 | 3500 | Unavailable |
| ... | ... | ... | ... | ... |
| ... | ... | ... | ... | ... |
| α | SATA | 50 | 1500 | USER B |

| PAGE ID | NUMBER OF IOPS | ALLOCATION STATE |
|---------|----------------|------------------|
| 1 | 850 | |
| 3 | 870 | |
| ... | ... | |
| ... | ... | |
| ... | ... | OK |
| 1010 | 4460 | OK |
| 990 | 4500 | OK |

| TIER | STORAGE MEDIA TYPE | CAPACITY [GB] |
|---|---|---|
| 1 | SSD | 10 |
| 2 | SAS15K | 20 |
| ... | ... | ... |
| ... | ... | ... |
| α | SATA | 40 |
| 3901 | 3902 | 3903 |

| TIER | STORAGE MEDIA TYPE | CAPACITY [GB] |
|---|---|---|
| 1 | SSD | 10 |
| 2 | SAS15K | 20 |
| ... | ... | ... |
| α | SATA | 40 |
| Total | - | 100 |

2240 (Total row), 2200 (table), 2210, 2220, 2230 (columns)

FIG.26

ADD THE FOLLOWING STORAGE MEDIA TO STORAGE TIERED

| ADDITIONAL STORAGE MEDIA No. | TYPE | CAPACITY |
| --- | --- | --- |
| 1 | SSD | 2 GB |
| 2 | SAS | 23 GB |
| 3 | SATA | 25 GB |

STRUCTURE OF STORAGE TIERED AFTER ADDITION WILL BE AS FOLLOWS

| TIER No. | TYPE | CAPACITY |
| --- | --- | --- |
| TIER 1 | SSD | 12 GB |
| TIER 2 | SAS | 73 GB |
| TIER 3 | SATA | 65 GB |

OK   CANCEL

FIG. 27

| STORAGE MEDIA | SSD | SAS | SATA | |
|---|---|---|---|---|
| (A) IDEAL CAPACITY IN IOPS DISTRIBUTION OF STORAGE TIERED | 10 | 50 | 40 | — 2510 |
| (B) IDEAL STRUCTURAL RATIO (CALCULATED BY USING IOPS LIMIT FROM IOPS DISTRIBUTION) | 10% | 50% | 40% | — 2520 |
| (C) TOTAL CAPACITY AFTER ADDITION | 150GB | | | — 2530 |
| (D) IDEAL CAPACITY AFTER ADDITION | 15GB | 75GB | 60GB | — 2540 |
| (E) SUBTRACT ACTUAL STRUCTURE OF PRESENT POOL | −15GB | −55GB | −30GB | — 2550 |
| (F) IDEAL ADDITIONAL CAPACITY | 0 GB | 20GB | 30GB | — 2560 |
| (G) ADD CARRY-OVER CAPACITY TO IDEAL ADDITIONAL CAPACITY | 2 GB | 25GB | 30GB | — 2570 |
| (H) COMPARE RETAINED CAPACITY WITH (G) | 5 GB | 23GB | 25GB | — 2580 |
| ALLOCATED CAPACITY | 2 GB | 23GB | 25GB | — 2590 |
| (I) CALCULATE CARRY-OVER CAPACITY ((G)-(H)) | 0 GB | 2 GB | 5 GB | — 2600 |

| STORAGE | STORAGE MEDIA TYPE | CAPACITY [GB] | IOPS LIMIT |
|---------|--------------------|--------------:|-----------:|
| ST2     | SAS 15K            | 50            | 3300       |
| ST3     | SAS 7.2K           | 30            | 1000       |
| ...     | ...                | ...           | ...        |
| ST3     | -                  | 30            | 900        |
| 2981    | 2982               | 2983          | 2984       |

| TIER ORDER | STORAGE MEDIA TYPE | CAPACITY [GB] | IOPS LIMIT | EXTERNALLY CONNECTED STORAGE MEDIA TYPE | USE AUTHORITY |
|---|---|---|---|---|---|
| 1 | SSD | 20 | 5000 | | USER A USER B |
| 2 | SAS15K | 30 | 3500 | | USER A |
| 2 | SAS15K | 20 | 3500 | | USER B |
| 3 | External 1 | 50 | 3300 | SAS15K | Unavailable |
| ... | ... | ... | ... | | ... |
| α | SATA | 50 | 1500 | | USER B |
| β | External 2 | 30 | 900 | - | USER A |

3210  3220  3230  3240  3250  3260

3200

COMPUTER SYSTEM AND STORAGE MANAGEMENT METHOD

TECHNICAL FIELD

The present invention relates to a computer system and a storage management method and is suited for use in, for example, a computer system and storage management method for dynamically allocating storage areas.

BACKGROUND ART

Recently, an amount of data dealt by a computer system has been increasing explosively. Along with an increase of the data amount, it is necessary to purchase new volumes as needed and add the volumes to a storage apparatus. The storage apparatus manages a plurality of hard disk drives (HDDs) by means of a RAID (Redundant Arrays of Independent/Inexpensive Disks) system. Then, the storage apparatus logicalizes physical storage areas of the plurality of hard disk drives and provides them as logical volumes to a host computer. The host computer accesses the provided logical volumes and requests reading/writing of data.

There is a function called Thin Provisioning as one of methods for providing logical volumes to a host computer. The thin provisioning function is a function providing virtualized logical volumes which do not have physical storage areas (hereinafter referred to as virtual volumes), to the host computer, and dynamically allocating the storage areas to the virtual volumes as triggered by write access by the host computer to the virtual volumes. The above-described thin provisioning function has the advantage that the virtual volumes of a larger capacity than that of storage areas, which can be actually provided, can be provided to the host computer and an inexpensive computer system can be configured by reducing the physical storage capacity, which should be prepared in advance, in a storage apparatus.

Furthermore, a method for managing each storage area provided by each of a plurality of kinds of storage media with different performance, which are mounted in a storage apparatus, as a plurality of kinds of different storage tiereds is suggested as a data management method for the storage apparatus equipped with the above-described thin provisioning function. Also, a technique called dynamic tiered control to migrate data in a storage tiered according to access frequency from the host computer is suggested. For example, storage areas are allocated from a high-speed and high-performance storage tier to an area where data with high access frequency is stored; and storage areas are allocated from a low-speed and low-performance storage tier to an area of the virtual volumes where data with low access frequency is stored. Furthermore, Patent Literature 1 discloses a technique of sorting data according to performance requirements and allocating storage areas of a high-performance storage tier to an area where data of a high performance requirement is stored.

If the above-described dynamic tiered control technique is used, cost performance for the storage apparatus can be enhanced. Accordingly, data stored in normal logical volumes are often managed by migrating such data to a storage tiered. Therefore, a sizing tool for calculating the structure of an appropriate storage tiered in accordance with a performance request from a user is provided.

CITATION LIST

Patent Literature

PTL 1: Japanese Patent Application Laid-Open (Kokai) Publication No. 2007-66259

SUMMARY OF INVENTION

Technical Problem

However, since Patent Literature 1 calculates the structure of a storage tiered by using a predefined combination of storage media, it sometimes results in a higher-cost structure than a case where storage media actually retained by the user are used. Furthermore, the structure of the storage tiered calculated by using the predefined combination of the storage media may sometimes include storage media, which are not actually retained by the user, or have a capacity shortage even if the storage media are retained by the user, so that the requested storage tiered cannot be created. In this case, it is necessary to purchase new storage media to replenish the storage media which are not retained by the user or to overcome the capacity shortage in order to realize the calculated structure of the storage tiered. So, the problem is that the storage media retained by the user cannot be utilized effectively.

The present invention was devised in consideration of the above-described circumstances and aims at suggesting a computer system and storage management method capable of recognizing the type and capacity of storage media of a storage apparatus, which are held by a user, and configuring a storage tiered that satisfies desired performance by using the storage media.

Solution to Problem

In order to solve the above-described problems, a computer system including a storage apparatus, a host computer requesting writing of data to the storage apparatus, and a management computer for managing the storage apparatus and the host computer, wherein the storage apparatus, the host computer, and the management computer are connected to each other via a network, is provided according to the present invention. The storage apparatus includes a plurality of kinds of storage media with different I/O performance, and a control unit for managing storage areas, which are provided by the plurality of kinds of storage media with the different I/O performance, as a storage tiered; wherein the control unit allocates a storage area from the storage tiered to a data storage area of a volume or volumes storing the data in response to a request from the host computer to write the data, obtains I/O frequency information of the data stored in the volume or volumes, and provides it to the management computer; wherein the management computer includes a storage unit for storing a pool structure information table for managing structure information of the storage tiered and a control unit for managing the structure of the storage tiered of the storage apparatus; and wherein the control unit obtains storage media information, including the I/O frequency of data stored in the volume or volumes, as well as structure information and the I/O performance of the storage media, from the storage apparatus, identifies a storage area of storage media with low I/O performance, which are not allocated to any of the volumes, from among the storage media with higher I/O performance than the I/O frequency of the data stored in the volume or volumes, on the basis of the structure information of the storage media, and issues an instruction to the storage apparatus to create the storage tiered by using a storage area of the identified storage media.

If the above-described configuration is used when adding a specified area of storage media to a storage tiered in response to a request from the host computer, the storage media information, including the I/O frequency of the data storage area of the volume(s) as well as the performance information and structure information of the storage media, can be obtained from the storage apparatus; one or more storage media which have not been allocated to the volume(s) with the I/O performance in excess of the I/O frequency can be identified based on the structure information of the storage media so that the data storage area of the volume(s), to which a specified storage area in the storage tiered is allocated, would achieve a specified I/O performance target; an instruction can be issued to the storage apparatus to create a storage tiered by using the identified storage media; and the storage apparatus can create the storage tiered that satisfies the desired performance, in accordance with the instruction. As a result, a low-cost storage tiered can be created by effectively utilizing the storage media in the storage apparatus.

Advantageous Effects of Invention

According to the present invention, storage media retained by a user can be utilized effectively and a low-cost storage tiered can be configured.

BRIEF DESCRIPTION OF DRAWINGS

FIG. 5 is a chart showing the content of a storage media information table according to the first embodiment.

FIG. 6 is a chart showing the content of an IOPS information table according to the first embodiment.

FIG. 7 is a chart showing the content of a structural ratio information table according to the first embodiment.

FIG. 21 is a chart showing the content of a storage tiered information table according to the third embodiment.

FIG. 26 is a conceptual diagram showing a display screen that presents the structure of storage media to be added according to the third embodiment.

FIG. 27 is a conceptual diagram explaining a specific example of processing for calculating the structure of additional capacity according to the third embodiment.

FIG. 30 is a chart showing the content of an external connection volume information table according to the fourth embodiment.

FIG. 31 is a chart showing the content of a storage media information table according to the fourth embodiment.

DESCRIPTION OF EMBODIMENTS

Figure 1:
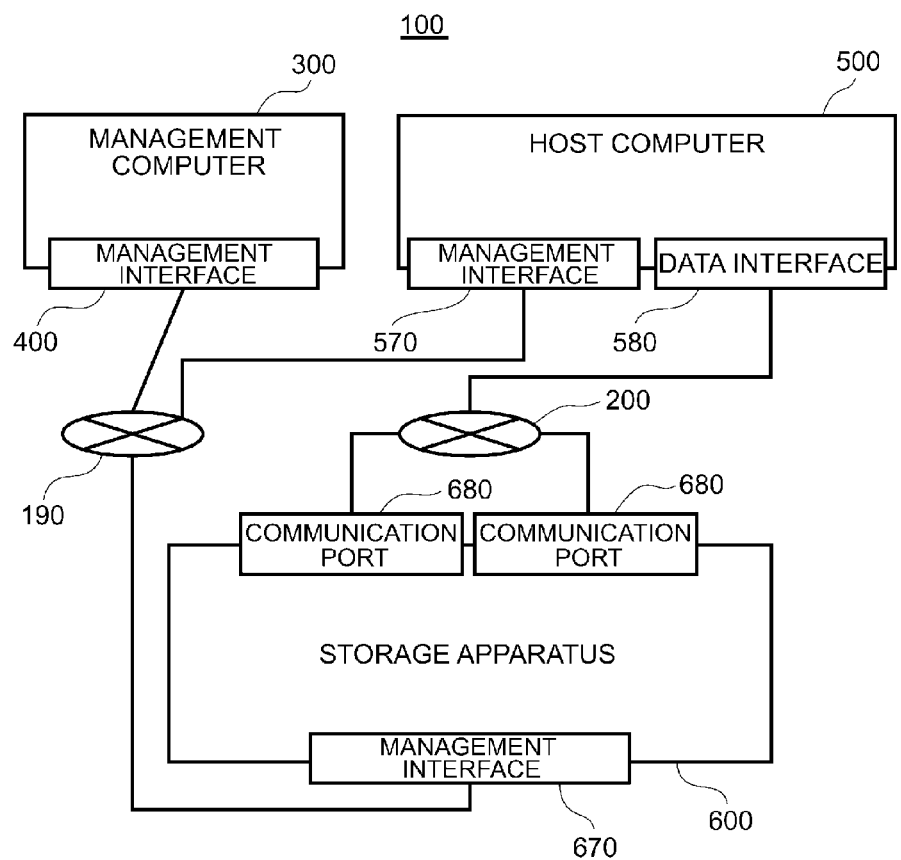
FIG. 1 is a block diagram showing a hardware configuration of a computer system according to a first embodiment of the present invention.

An embodiment of the present invention will be explained in detail with regard to the drawings. In this embodiment, an explanation will be given by taking a storage apparatus as an example of a storage control device. The storage control device can be distinguished by, for example, checking whether it contains physical storage devices or not. An example of a storage control device capable of containing physical storage devices is a storage apparatus. An example of a storage control device which does not contain physical storage devices is a switch device. The switch device can provide a host computer with physical storage devices belonging to an external storage apparatus as if they were storage devices in the switch device.

Incidentally, various kinds of information may sometimes be explained by using the expression "xxx table"; however, the various kinds of information may be expressed with a data structure other than a table. The expression "xxx information" can be also used instead of "xxx table" in order to indicate that the various kinds of information do not depend on the data structure. An ID (identifier) or number will be used to identify the relevant element in the following explanation, but other kinds of information (for example, a name) may be used as identification information.

A "program" may be used as a subject in the following explanation in order to describe processing; however, since a program is executed by a processor (for example, CPU (Central Processing Unit)) to perform defined processing by using memory resources (for example, a memory) and/or communication interface device (for example, a communication port) as necessary, the subject of the processing may be the processor. Processing described by using a program as a subject may be processing executed by a storage apparatus, a controller for the storage apparatus, or a management computer. The processor may contain a hardware circuit for executing any part of or the entire processing executed by the processor. A computer program may be installed from a program source to each computer. The program source may be, for example, a program distribution server or storage media.

(1) First Embodiment (1-1) Outline of this Embodiment

The outline of this embodiment will be explained. Recently, an amount of data dealt by a computer system has been increasing explosively. Along with an increase of the data amount, it is necessary to purchase new volumes as needed and add the volumes to a storage apparatus. The storage apparatus manages a plurality of hard disk drives by means of a RAID system. Then, the storage apparatus logicalizes physical storage areas of the plurality of hard disk drives and provides them as logical volumes to a host computer. The host computer accesses the provided logical volumes and requests reading/writing of data.

There is a function called Thin Provisioning as one of methods for providing logical volumes to a host computer. The thin provisioning function is a function providing virtualized logical volumes which do not have physical storage areas (hereinafter referred to as virtual volumes), to the host computer, and dynamically allocating the storage areas to the virtual volumes as triggered by write access by the host computer to the virtual volumes. The above-described thin provisioning function has the advantage that the virtual volumes of a larger capacity than that of storage areas, which can be actually provided, can be provided to the host computer and an inexpensive computer system can be configured by reducing the physical storage capacity, which should be prepared in advance, in a storage apparatus.

Furthermore, a method for managing each storage area provided by each of a plurality of kinds of storage media with different performance, which are mounted in a storage apparatus, as a plurality of kinds of different storage tiereds is suggested as a data management method for the storage apparatus equipped with the above-described thin provisioning function. Also, a technique called dynamic tiered control to migrate data in a storage tiered according to access frequency from the host computer is suggested. For example, storage areas are allocated from a high-speed and high-performance storage tier to an area where data with high access frequency is stored; and storage areas are allocated from a low-speed and low-performance storage tier to an area of the virtual volumes where data with low access frequency is stored. Furthermore, a technique of sorting data according to performance requirements and allocating storage areas of a high-performance storage tier to an area where data of a high performance requirement is stored is disclosed.

If the above-described dynamic tiered control technique is used, cost performance for the storage apparatus can be enhanced. Accordingly, data stored in normal logical volumes are often managed by migrating such data to a storage tiered. Therefore, a sizing tool for calculating the structure of an appropriate storage tiered in accordance with a performance request from a user is provided. This sizing tool estimates IOPS distribution by using a template of an IPO (I/O per Second) pattern of each application retained by the sizing tool in advance on the basis of the capacity of a storage tiered requested by the user and the types of applications used by the user. The IOPS herein used is a value indicative of I/O frequency of data, which is the number of I/O accesses per second to storage media. Furthermore, the IOPS distribution is information indicative of distribution of pages sorted in descending order of IOPS information. Then, an appropriate combination of storage media is selected from a list of combinations of storage media retained by the sizing tool in advance and the structure of a storage tiered that realizes appropriate performance and cost is calculated based on IPOS limit information of each storage media.

However, when the structure of the storage tiered is calculated by using a predefined combination of storage media, it sometimes results in a higher-cost structure than a case where storage media actually retained by the user are used. Furthermore, the structure of the storage tiered calculated by using the combination of the predefined storage media may sometimes include storage media, which are not actually retained by the user, or have a capacity shortage even if the storage media are retained by the user, so that the requested storage tiered cannot be created. In this case, it is necessary to purchase new storage media to replenish the storage media which are not retained by the user or to overcome the capacity shortage in order to realize the calculated structure of the storage tiered. So, the problem is that the storage media retained by the user cannot be utilized effectively.

So, in this embodiment, IOPS distribution of an existing logical volume and the type and capacity of storage media held by the user are obtained from the storage apparatus; storage media with the lowest performance is selected; the capacity requiring the performance of such storage media is calculated; and the calculated capacity is compared with the capacity of the storage media retained by the user. If the calculated capacity is equal to or less than the capacity of the storage media held by the user, storage media of the calculated capacity is allocated to a storage tiered from the capacity of the storage media held by the user. On the other hand, if the calculated capacity is more than the capacity of the storage media held by the user, the entire capacity of the storage media held by the user is allocated to a storage tiered; and regarding the remaining required capacity, storage media with the next lower performance is selected and the capacity of such storage media is allocated to the storage tiered. As a result, a storage tiered that satisfies the desired performance can be configured by recognizing the type and capacity of the storage media of the storage apparatus held by the user and using such storage media.

(1-2) Hardware Configuration of Computer System

Next, the hardware configuration of a computer system 100 will be explained. Referring to FIG. 1, the computer system 100 is constituted from a management computer 300, a host computer 500, and a storage apparatus 600.

Incidentally, for ease of explanation, FIG. 1 shows the configuration including one host computer 500 and one storage apparatus 600; however, the configuration is not limited to the above configuration and a plurality of host computers and a plurality of storage apparatuses may be included.

Furthermore, a management interface 670 for the storage apparatus 600, a management interface 570 for the host computer 500, and a management interface 499 for the management computer 300 are connected via a specified management network 190. Consequently, the management computer 300 can communicate with the storage apparatus 600 and the host computer 500. The management network 190 can be, for example, a LAN (Local Area Network) 190; and if the management network 190 is a LAN, the management interfaces 400, 570, 670 can be, for example, LAN cards.

Furthermore, a communication port 680 for the storage apparatus 600 and a data interface 580 for the host computer 500 are connected via a specified data communication network 200. Consequently, the storage apparatus 600 can communicate with the host computer 500 each other. The data communication network 200 can be, for example, a SAN (Storage Area Network) 200; and if the data communication network 200 is a SAN, the data interface 580 can be, for example, an HBA (Host Bus Adapter).

The management computer 300 is a computer device for maintaining and managing the storage apparatus 600. The host computer 500 sends a data read/write request to the storage apparatus 600 connected via the data communication network 200. Also, the storage apparatus 600 interprets commands sent from the host computer 500 connected via the data communication network 200 and executes data reading from or data writing to storage media in the storage apparatus 600.

A case where a storage tiered is created in the storage apparatus 600 by using the storage media retained in the storage apparatus 600 will be explained below. This embodiment can be used in a case where a new storage tiered is created or a case where an existing logical volume is migrated to a storage tiered. However, when a new storage tiered is created, a logical volume that is a target for obtaining necessary IOPS distribution to calculate the structure of the storage tiered does not exist. Therefore, it is necessary to calculate the structure of the storage tiered by estimating the IOPS distribution based on, for example, the capacity of the storage tiered requested by the user and IOPS pattern information defined in advance.

(1-2-1) Configuration of Management Computer

Figure 2:
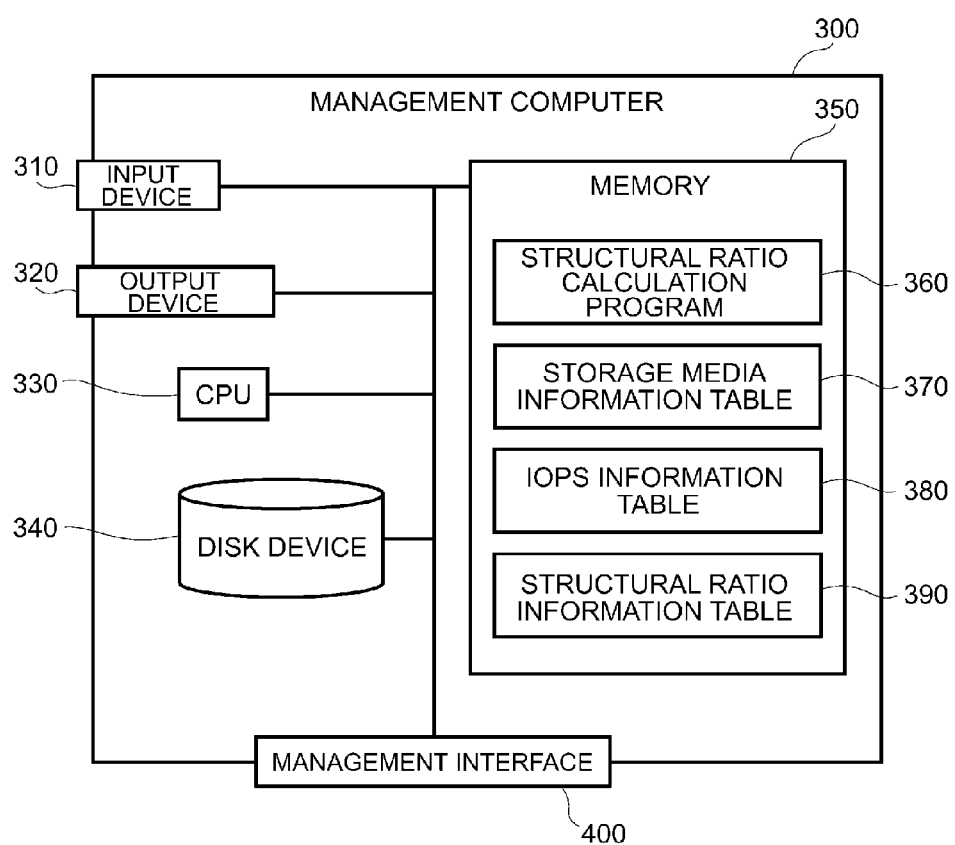
FIG. 2 is a block diagram showing the configuration of a management computer according to the first embodiment.

Next, the configuration of the management computer 300 will be explained. Referring to FIG. 2, the management computer 300 is constituted from, for example, an input device 310, an output device 320, a processor (indicated as CPU in the drawing) 330, a disk device 340, a memory 350, and a management interface 400. The management computer 300 is composed of, for example, a personal computer or a workstation.

The input device 310 is a device used by a user such as a system administrator to issue instructions to the management computer 300. Examples of the input device 310 can include a keyboard, a pointing device, a switch, a touch panel, and a microphone. The output device 320 is a device used by the management computer 300 to output information to the user such as the system administrator. Examples of the output device 320 can include a monitor display, a speaker, and a printer.

The processor 330 realizes various functions described later by controlling the operation of the management computer 300 in accordance with, for example, programs and operation parameters stored in the memory 350. The disk device 340 is a physical storage device and examples of the disk device 340 can include HDD and SSD (Solid State Drive). Regarding the HDD, there are HDD in accordance with SAS (hereinafter referred to as SAS) and HDD in accordance with SATA (hereinafter referred to as SATA).

The memory 350 stores, for example, a structural ratio calculation program 360, a storage media information table 370, an IOPS information table 380, and a structural ratio information table 390. The details of the storage media information table 370, the IOPS information table 380, and the structural ratio information table 390 will be explained later.

The structural ratio calculation program 360 is a computer program for calculating the structure of the storage media based on the IOPS distribution in response to a request entered by the user such as the system administrator to the input device 310. Specifically speaking, the structural ratio calculation program 360 identifies the structure of the storage media allocated to a designated logical volume, compares the identified storage media with information of the storage media actually retained by the user, creates a storage tiered having the calculated structure, and issues an instruction to the device management program 630, the storage media management program 640, and the dynamic tiered control program 660 for the storage apparatus 600 to execute processing such as migration of existing data. Processing of the structural ratio calculation program 360 will be explained later in detail.

The management interface 400 is a communication interface used by the management computer 300 to access the storage apparatus 600 via the management network 190.

Incidentally, when the CPU executes processing based on the structural ratio calculation program 360, an explanation will be given by referring to the structural ratio calculation program 360 as a subject.

(1-2-2) Configuration of Host Computer

Figure 3:
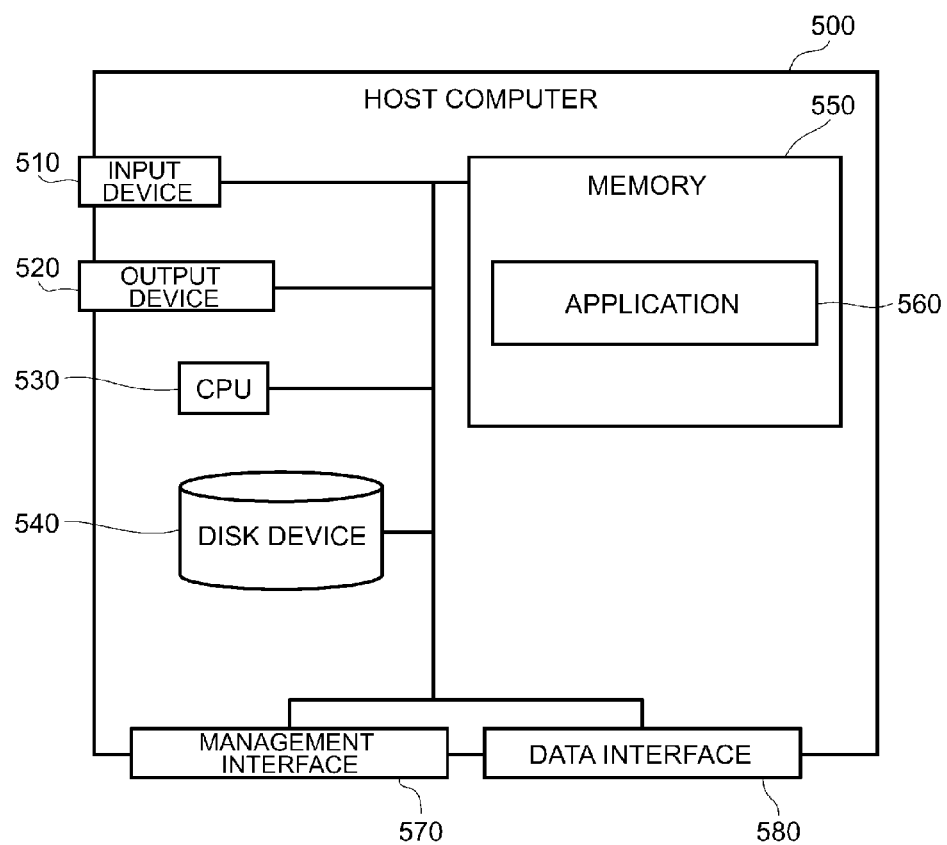
FIG. 3 is a block diagram showing the configuration of a host computer according to the first embodiment.

Next, the configuration of the host computer 500 will be explained. Referring to FIG. 3, the host computer 500 is constituted from, for example, an input device 510, an output device 520, a processor (indicated as CPU in the drawing) 530, a disk device 540, a memory 550, a management interface 570, and a data interface 580. The host computer 500 is a computer device issuing I/O commands.

The input device 510 is a device used by the user to issue I/O commands via the host computer 500 to the storage apparatus 500 connected via the host computer 300 and the data interface 580. Examples of the input device 510 can include a keyboard, a pointing device, a switch, a touch panel, and a microphone. The output device 520 is a device used by the management computer 300 to output information to the user. Examples of the output device 520 can include a monitor display, a speaker, and a printer.

The processor 530 controls the operation of the host computer 500 in accordance with, for example, programs and operation parameters stored in the memory 550. The disk device 540 is a physical storage device and examples of the disk device 540 can include HDD and SSD. Regarding the HDD, there are HDD in accordance with SAS (hereinafter referred to as SAS) and HDD in accordance with SATA (hereinafter referred to as SATA).

The memory 550 stores, for example, an application 560. The memory 550 may store a plurality of applications.

The management interface 570 is a communication interface for accessing the management computer 300 via the management network 190. The data interface 580 is a communication interface for accessing the storage apparatus 600 via the data communication network 200.

(1-2-3) Configuration of Storage Apparatus

Figure 4:
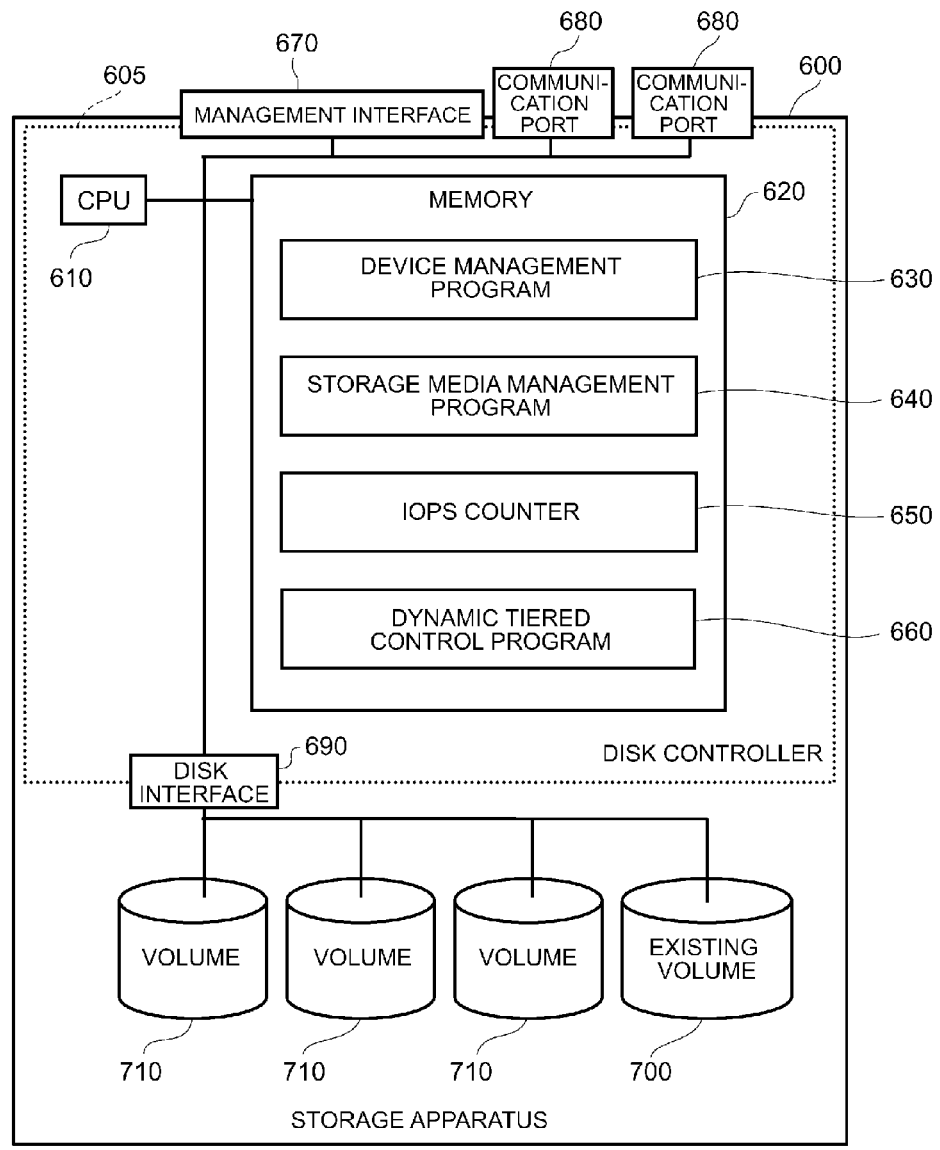
FIG. 4 is a block diagram showing the configuration of a storage apparatus according to the first embodiment.

Next, the configuration of the storage apparatus 600 will be explained. Referring to FIG. 4, the storage apparatus 600 is constituted from, for example, a disk controller 605, an existing volume 700 and volumes 710.

The disk controller 605 includes a processor (indicated as CPU in the drawing) 610, a memory 620, a management I/F 670, communication ports 680, and a disk interface 690.

The processor 610 realizes various functions described later by controlling the operation of the storage apparatus 600 in accordance with, for example, programs and operation parameters stored in the memory 620. The memory 620 stores, for example, a device management program 630, a storage media management program 640, an IOPS counter 650, and a dynamic tiered control program 660.

This embodiment can be used in a case where a new storage tiered is created or a case where an existing logical volume 700 is migrated to a storage tiered. However, when a new storage tiered is created, a logical volume that is a target for obtaining necessary IOPS distribution to calculate the structure of the storage tiered does not exist. Therefore, the IOPS distribution is estimated based on, for example, the capacity of the storage tiered requested by the user and IOPS pattern information defined in advance. When estimating the IOPS distribution from the predefined information, it is unnecessary to provide the IOPS counter 650 in the memory 620 to store an I/O counter.

The device management program 630 is a computer program for managing the storage apparatus 600. The device management program 630 accepts I/O from, for example, the host computer 500, sets various settings to the storage apparatus 600, and collects information from the storage apparatus 600.

The storage media management program 640 is a computer program for managing logical volumes in the storage apparatus 600. The storage media management program 640, for example, creates or deletes the volumes 710 in the storage apparatus 600 and collects various information about the volumes.

The IOPS counter 650 is a computer program for managing the number of times of accesses to the existing volume 700 in the storage apparatus 600. The IOPS counter 650, for example, calculates an average of the number of times of accesses per second (IOPS) to the existing volume 700 in the storage apparatus 600. Furthermore, the IOPS counter 650 increases or decreases the number of times of accesses to the existing volume 700 in the storage apparatus 600.

The dynamic tiered control program 660 is a computer program for managing the operation of the storage tiered. The dynamic tiered control program 660, for example, creates or deletes a storage tiered in the storage apparatus 600. Furthermore, the dynamic tiered control program 660 obtains the IOPS from the IOPS counter 650 and creates IOPS distribution by sorting the IOPS in descending order of the number of IOPS. The IOPS distribution will be explained later in detail.

The management interface 670 is a communication interface for accessing the management computer 300 and the host computer via the management network 190. The communication port 680 is a communication interface for accepting access from the host computer 500 via the data communication network 200.

The disk interface 690 is an interface used by the disk controller 605 to access the existing volume 700 or the volume 710. The existing volume 700 is a volume, such as a physical volume or a logical volume or a pool, in which data is already stored. Examples of the physical volume can include various devices capable of reading/writing data, such as hard disk drives, semiconductor memory devices, optical disk devices, and magneto-optical disk devices.

If the hard disk devices are to be used, for example, FC (Fibre Channel) disks, SCSI (Small Computer System Interface) disks, SATA disks, ATA (Attachment) disks, and SAS (Serial Attached SCSI) disks can be used. Also, storage devices such as flash memory, FeRAM (Ferroelectric Random Access Memory), MRAM (Magnetoresistive Random Access Memory), phase change memory (Ovonic Unified Memory), and RRAM (Resistance RAM) may be used.

The volume 710 is a physical volume or a logical volume and is a volume that can be used for a storage tiered. Examples of the physical volume can be the same storage devices of the existing volume 700.

(1-3) Structural Ratio Calculation Processing

Next, structural ratio calculation processing executed by the structural ratio calculation program 360 of the management computer 300 will be explained. Before explaining the details of the structural ratio calculation processing, various kinds of information stored in the memory 350 for the management computer 300 will be explained.

The storage media information table 370 is a table for managing various kinds of information of each storage media in the storage apparatus 600 and is constituted from a tier order column 3701, a storage media type column 3702, a capacity column 3703, an IOPS limit column 3704, and a use authority column 3705 as shown in FIG. 5. The tier order column 3701 stores information indicating the tier order of the storage media. Specifically speaking, the tier order according to the size of an IOPS limit for the storage media is stored. The storage media type column 3702 stores information indicating the type of the storage media and stores, for example, "SSD" or "SAS15K." The capacity column 3703 stores information indicating the capacity of each storage media. The IOPS limit column 3704 stores information indicating the IOPS limit for each storage media. The IOPS limit is the maximum number of IOPS for each page that can be processed by each storage media. The information stored in the IOPS limit column 3704 may be a predefined value or a value counted by the IOPS counter 650 after actual transmission of test I/O by the device management program 630 of the storage apparatus 600 to the volume 710. The use authority column 3705 stores information indicating the use authority of each user with respect to each storage media.

In the environment where the use authority is set to each storage media, for example, user A can select storage media to use only from an aggregate of storage media over which the user authority is granted to user A. For example, user A can select and use, for example, SSD with a capacity of 20 GB in the tier order 1 and SAS15 with a capacity of 30 GB in the tier order 2. However, user A cannot select storage media over which the use authority is granted to only user B (SAS15K with a capacity 20 of GB in the tier order 2 and SATA50GB in the tier order a) or storage media over which the use authority is not granted to any user at present (SAS15K with a capacity of 10 GB in the tier order 2).

The IOPS information table 380 is a table for managing the number of IOPS for each page of the existing volume 700 and is constituted from a page ID column 3801, a number-of-IOPS column 3802, and an allocation state column 3803 as shown in FIG. 6. The page ID column 3801 stores information for identifying a page of the existing volume 700. The number-of-IOPS column 3802 stores the number of IOPS of data stored in each page. The allocation state column 3803 stores information indicating an allocation state of the storage media to each page. For example, if the storage media to be allocated to each page is calculated by the structural ratio calculation program 360, OK is stored; and if the storage media to be allocated to each page is not calculated by the structural ratio calculation program 360, the relevant field remains as a blank space.

The structural ratio information table 390 is a table for managing the structure of a storage tiered and is constituted from a tier column 3901, a storage media type column 3902, and a capacity column 3903 as shown in FIG. 7. The tier column 3901 stores information for identifying each tier of the storage tiered. The storage media type column 3902 stores information indicating the type of storage media constituting each tier. The capacity column 3903 stores information indicating the capacity of storage media to be allocated to each tier. Under this circumstance, the capacity of the storage media is calculated from a capacity area defined for an area corresponding to a page(s) storing data and the number of areas corresponding to a page(s) to which such storage media is to be allocated. Also, the capacity of the storage media may include a control area of the data besides a storage area of the data. FIG. 7 shows that Tier 1 is composed of SSD storage media and the capacity of Tier 1 is 10 GB; and Tier 2 is composed of SAS15K storage media and the capacity of Tier 2 is 20 GB.

Figure 8:
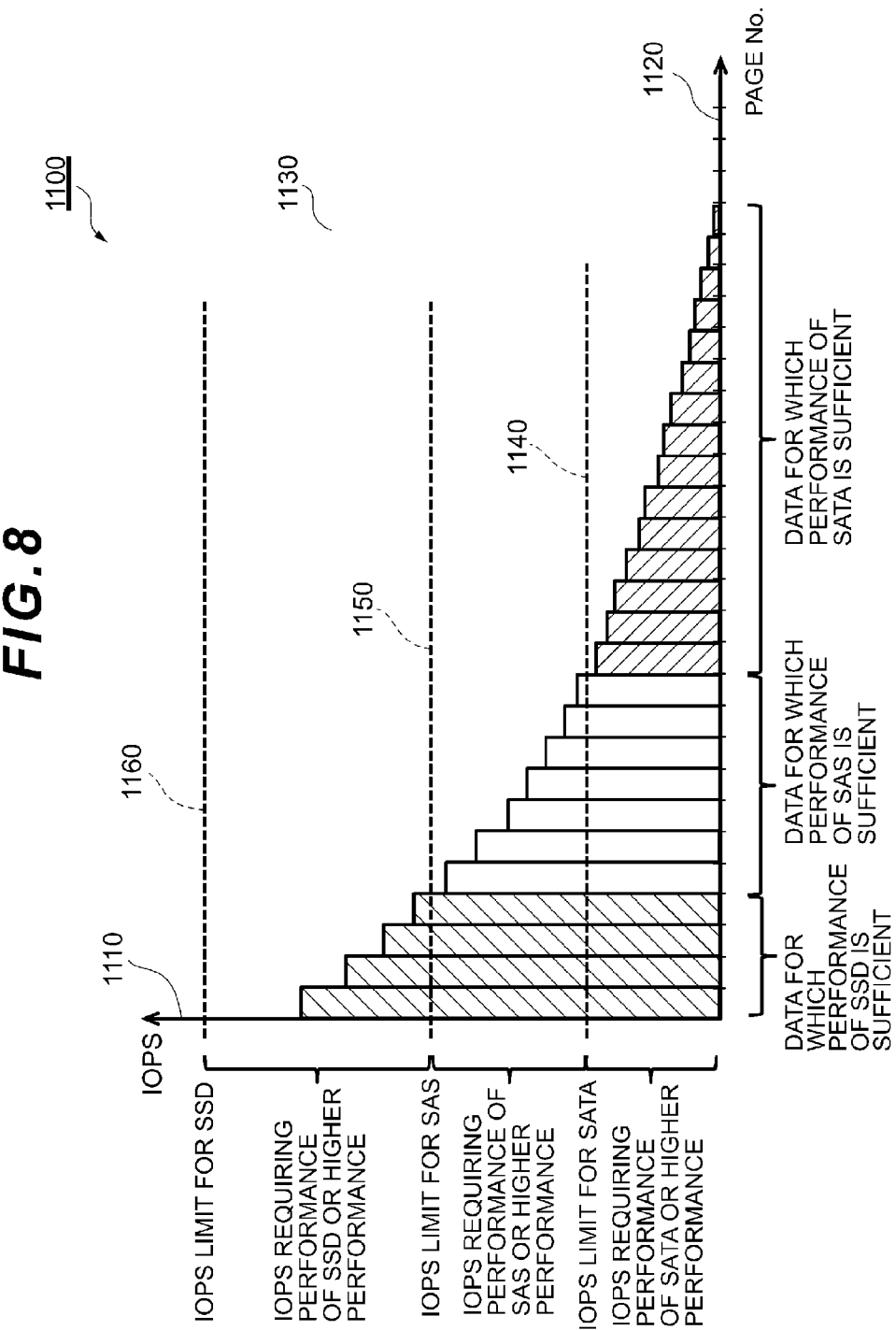
FIG. 8 is a graph showing IOPS distribution according to the first embodiment.

Next, the IOPS distribution will be explained. FIG. 8 is a graph indicating IOPS distribution 1100 and the IOPS distribution is obtained by sorting pages in descending order of IOPS of data stored in each page on the basis of the information stored in the IOPS information table 380 and the storage media information table 370. As shown in FIG. 8, the vertical axis 1110 of the IOPS distribution 1100 represents the number of I/O per second and the horizontal axis 1120 represents the page ID and each bar 1130 represents IOPS from the host computer 500 to data stored in the corresponding page ID.

As shown in FIG. 8, for example, an IOPS limit (1500) in a case where the storage media type is SATA is obtained from the storage media information table 370; a value of that IOPS limit is plotted on the vertical axis 1110; and a dashed line 1140 is drawn in the IOPS distribution 1100. The dashed line 1140 makes it possible to realize the capacity of pages with the IOPS which requires the storage media having performance of SATA or higher performance and for which performance of SATA is sufficient. Furthermore, an IOPS limit (3500) in a case where the storage media type is SAS is obtained from the storage media information table 370; a value of that IOPS limit is plotted on the vertical axis 1110; and a dashed line 1150 is drawn in the IOPS distribution 1100. The dashed line 1150 makes it possible to realize the capacity of pages with the IOPS which requires the storage media having performance of SAS or higher performance and for which performance of SAS is sufficient. Furthermore, an IOPS limit (5000) in a case where the storage media type is SSD is obtained from the storage media information table 370; a value of that IOPS limit is plotted on the vertical axis 1110; and a dashed line 1160 is drawn in the IOPS distribution 1100. The dashed line 1160 makes it possible to realize the capacity of pages with the IOPS which requires the storage media having performance of SSD or higher performance and for which performance of SSD is sufficient. Therefore, the use of the IOPS distribution 1100 makes it possible to calculate the capacity of the IOPS, for which the performance of each storage media is sufficient, and identify an ideal structure of storage media corresponding to the IOPS distribution.

Figure 9:
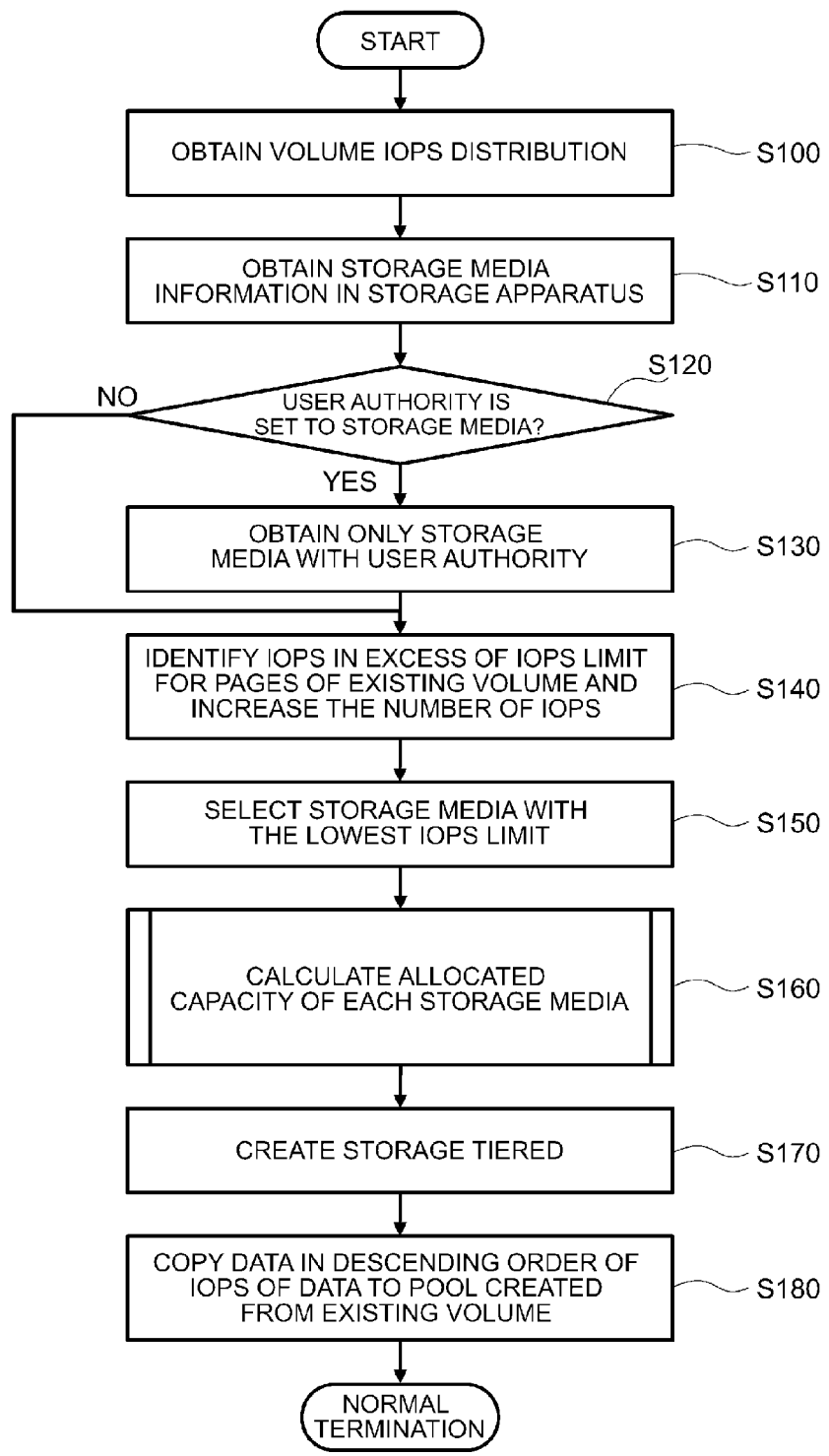
FIG. 9 is a flowchart illustrating a processing sequence for structural ratio calculation processing according to the first embodiment.

Next, the details of the structural ratio calculation processing executed by the structural ratio calculation program 360 will be explained. When a request for creation of a storage tiered is made in response to input by the user, FIG. 9 shows a processing sequence executed by the structural ratio calculation program 360 for calculating the structure of the storage tiered with respect to the requested IOPS distribution.

Figure 11:
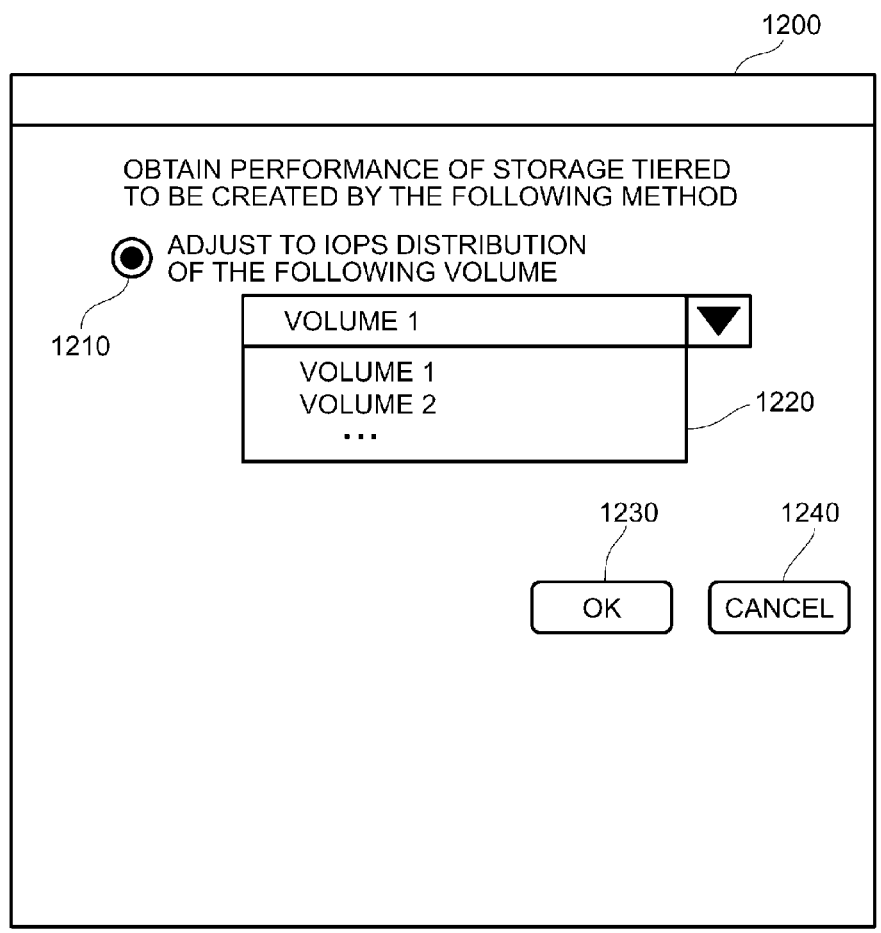
FIG. 11 is a conceptual diagram showing a storage tiered creation instruction screen according to the first embodiment.

The structural ratio calculation processing described below is executed when an instruction to create a storage tiered is issued by means of input by the user. The storage tiered creation instruction is issued via a storage tiered creation instruction screen 1200. Now, the details of the storage tiered creation instruction screen 1200 will be explained. Referring to FIG. 11, the storage tiered creation instruction screen 1200 includes a radio button 1210 for selecting a method for obtaining the performance of the storage tiered to be created, a selection box 1220 for selecting an existing volume, an OK button 1230 for commanding the execution of the processing, and a cancel button 1240 for terminating the screen without executing the processing.

The radio button 1210 is mainly used when a storage tiered is created based on the IOPS distribution obtained from data of the existing volume 700. If data which should be the basis of the IOPS distribution does not exist and a storage tiered is newly created, the IOPS distribution is estimated based on the performance of the application(s) 560 in the memory 550 for the host computer 500. In this case, a text box for inputting the capacity of the storage tiered, a selection box for selecting a performance pattern of the application, and an add button for increasing input items when there are a plurality of applications may be included as necessary items for estimating the IOPS distribution. Furthermore, a screen by which the user directly creates the IOPS distribution may be displayed.

Referring back to FIG. 9, the structural ratio calculation program 360 firstly obtains the IOPS distribution 1100 of the existing volume 700 from the storage apparatus 600 (S100). Specifically speaking, the structural ratio calculation program 360 issues an instruction to the dynamic tiered control program 660 of the storage apparatus 600 to obtain the IOPS information of the existing volume 700 and create the IOPS distribution 1100 shown in FIG. 8. However, if a storage tiered is to be newly created, the logical volume 710 which is a target to obtain necessary IOPS distribution for calculating the structure of the storage tiered does not exists, so that the IOPS distribution is estimated based on, for example, the capacity of the storage tiered requested by the user and the predefined IOPS pattern information.

Subsequently, the structural ratio calculation program 360 refers to the storage media information table 370 and obtains information of the storage media in the storage apparatus 600 (S110).

Then, the structural ratio calculation program 360 judges whether or not the user authority is set to the storage media obtained in step S110 (S120). If it is determined in step S120 that the user authority is set to the storage media, the structural ratio calculation program 360 obtains only information of the storage media to which the user authority is set (S130). Specifically speaking, the structural ratio calculation program 360 refers to the use authority column 3705 of the storage media, which is a target of the storage media information table 370, and obtains only the storage media which can be used by the user as a storage tiered. On the other hand, if it is determined in step S120 that the user authority is not set to the storage media, the structural ratio calculation program 360 executes processing in step S140.

Next, the structural ratio calculation program 360 identifies the IOPS in excess of the IOPS limit for the existing volume 700 in the storage apparatus 600 and increases the number of IOPS (S140). Specifically speaking, the structural ratio calculation program 360 refers to the IOPS distribution of the existing volume 700 obtained in step S100 and identifies the IOPS in excess of the IOPS limit. The IOPS in excess of the IOPS limit herein used means, for example, the IOPS in excess of the dashed line 1140, 1150, 1160 of the IOPS limit for each storage media or the IOPS in the vicinity of the dashed lines 1140 and so on as shown in FIG. 8. Then, the structural ratio calculation program 360 issues an instruction to the dynamic tiered control program 660 of the storage apparatus 600 to increase the number of IOPS of the identified IOPS.

Next, the structural ratio calculation program 360 obtains the storage media with the lowest IOPS limit from among the information of the storage media obtained in step S110 (S150). This means that, on the basis that the performance of the storage media is proportional to the cost of the storage media, a storage tiered is created with the lowest-cost storage media from among the storage media in the storage apparatus 600 by selecting the storage media with the lowest IOPS limit. However, if the performance of the storage media is not proportional to the cost of the storage media, the storage media may be selected in accordance with characteristics of the storage media which satisfy the cost of the storage media and other requirements.

Next, the structural ratio calculation program 360 calculates the allocated capacity of the storage media selected in step S150 (S160). Processing for calculating the allocated capacity of the storage media in step S160 will be explained later in detail.

Subsequently, the structural ratio calculation program 360 creates the storage tiered based on the calculation result in step S160 (S170). Specifically speaking, the structural ratio calculation program 360 refers to the structural ratio information table 390, in which the calculation result in step S160 is reflected, and issues an instruction to the device management program 630 of the storage apparatus 600 to create the storage tiered in accordance with structural ratio information of the structural ratio information table 390.

Figure 12:
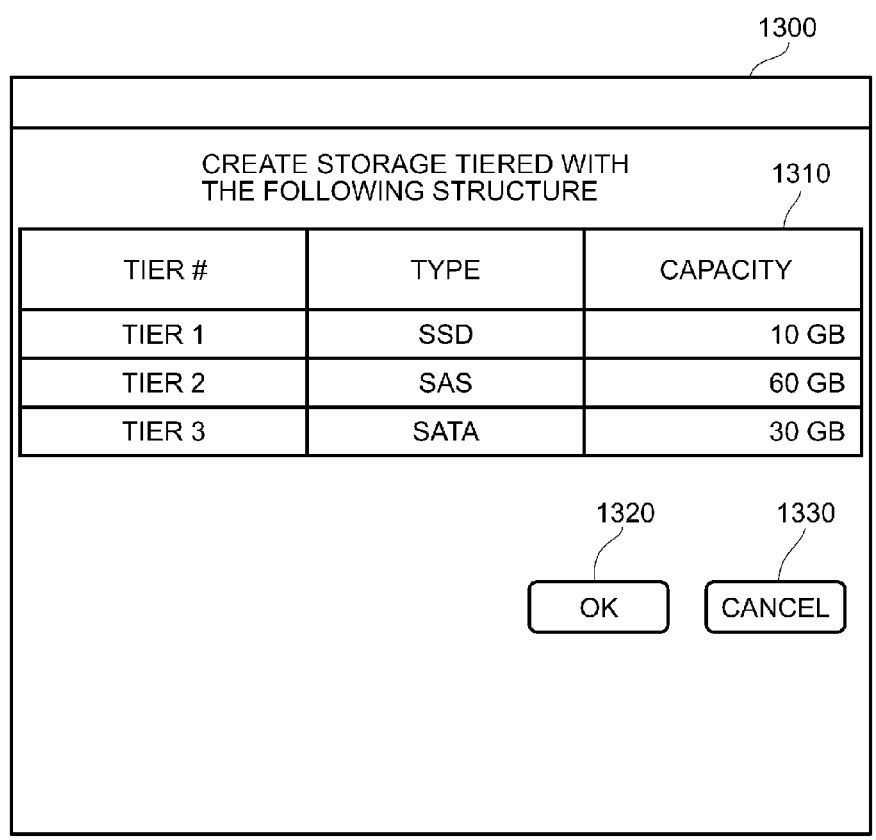
FIG. 12 is a conceptual diagram showing a display screen that presents the structure of a storage tiered according to the first embodiment.

The structural ratio calculation program 360 may present the structure of the storage tiered to the user before issuing the instruction to the device management program 630 of the storage apparatus 600 to create the storage tiered. For example, the structural ratio calculation program 360 displays a display screen 1300 shown in FIG. 12 and presents the structure of the storage tiered to the user. The display screen 1300 includes a structure list 1310 of the storage tiered to be created, an OK button 1320 for executing the storage tiered creation instruction, and a cancel button 1330 for terminating the screen without executing the storage tiered creation instruction.

The content to be displayed on the display screen 1300 may be designed so that the structure of the storage tiered is presented based on the structural ratio information table 390 by, for example, integrating several tiers in accordance with a constraint(s) of the dynamic tiered control.

Referring back to FIG. 9, the structural ratio calculation program 360 copies data to the storage tiered created in step S170 in descending order of the IOPS of the data, starting from the highest IOPS (S180). Specifically speaking, the structural ratio calculation program 360 refers to the IOPS distribution obtained in step S100 and issues an instruction to the device management program 630 of the storage apparatus 600 to migrate the data to the created storage tiered in descending order of the IOPS of the data, starting from the highest IOPS.

Figure 10:
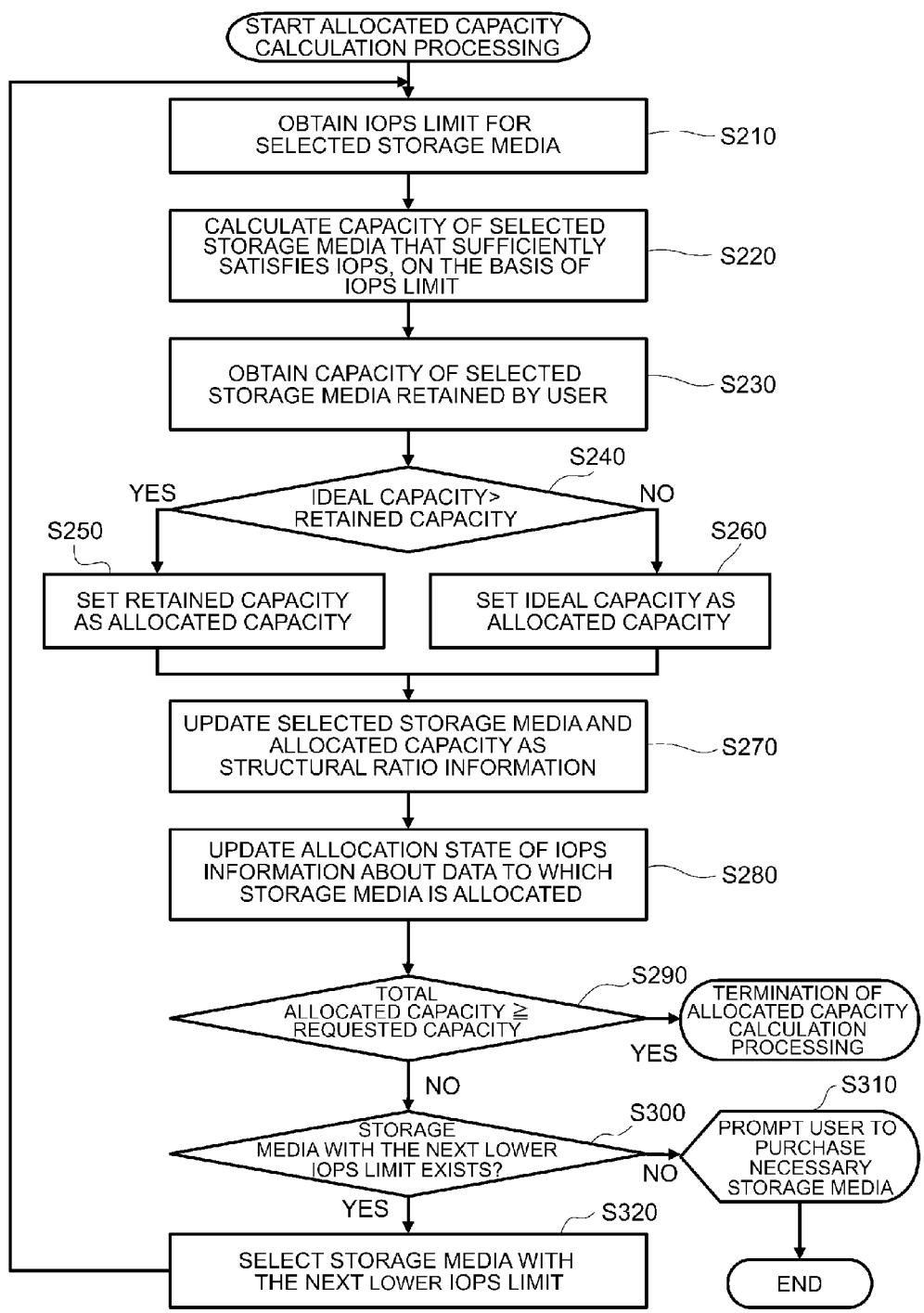
FIG. 10 is a flowchart illustrating a processing sequence for processing for calculating an allocated capacity of storage media according to the first embodiment.

Next, the details of the processing for calculating the allocated capacity of the storage media in step S160 will be explained. As shown in FIG. 10, the structural ratio calculation program 360 obtains the IOPS limit for the storage media selected in step S150 (S210).

Next, the structural ratio calculation program 360 calculates the capacity of pages for which the performance of the selected storage media sufficiently satisfies the IOPS (hereinafter referred to as the ideal capacity), on the basis of the information of the IOPS distribution obtained in step S100 and the IOPS limit for the storage media obtained in step S210 (S220). For example, assuming that the structural ratio calculation program 360 selects SATA in step S150, it identifies the capacity of pages (the number of pages) which requires the storage media with the performance of SATA and higher performance and for which the performance of SATA is sufficient, on the basis of the IOPS distribution shown in FIG. 8 and the IOPS limit for SATA as shown with the dashed line 1140.

Next, the structural ratio calculation program 360 obtains the capacity of the storage media selected in step S150 (hereinafter referred to as the retained capacity) from among the information of the storage media retained in the storage apparatus 600 obtained in step S110 (S230).

Then, the structural ratio calculation program 360 compares the ideal capacity calculated in step S220 with the retained capacity obtained in step S230 (S240).

If it is determined in step S240 that the ideal capacity is larger than the retained capacity, the structural ratio calculation program 360 sets the retained capacity as the allocated capacity of the selected storage media (S250). The case where the ideal capacity is larger than the retained capacity means that the capacity of the target storage media in the storage apparatus 600 is less than the ideal capacity of the storage media derived from the IOPS distribution calculated in step S220.

If it is determined in step S240 that the retained capacity is equal to or more than the ideal capacity, the structural ratio calculation program 360 sets the ideal capacity as the allocated capacity of the selected storage media (S260). The case where the retained capacity is equal to or more than the ideal capacity means that the capacity of the target storage media in the storage apparatus 600 exceeds the ideal capacity of the storage media derived from the IOPS distribution calculated in step S220.

Next, the structural ratio calculation program 360 associates the allocated capacity of the storage media calculated in step S250 or 260 with the selected storage media and stores them in the structural ratio information table 390 (S270).

Then, the structural ratio calculation program 360 stores "OK," which indicates that the storage media is allocated to the relevant page, in the allocation state column 3803 of the IOPS information table 380 with respect to the page to which the selected storage media is allocated (S280).

Subsequently, the structural ratio calculation program 360 compares the capacity of the storage media written to the structural ratio information table 390, that is, a total of the allocated capacity (hereinafter referred to as the total allocated capacity) with the desired capacity of the storage tiered (S290).

If it is determined in step S290 that the total allocated capacity is equal to or more than the desired capacity of the storage tiered, the structural ratio calculation program 360 terminates the allocated capacity calculation processing.

If it is determined in step S290 that the total allocated capacity is less than the desired capacity of the storage tiered, the structural ratio calculation program 360 executes processing in step S300.

Subsequently, the structural ratio calculation program 360 judges whether the storage media with the next lower IOPS limit exists or not (S300). If it is determined in step S300 that the storage media with the next lower IOPS limit exists, the structural ratio calculation program 360 selects such storage media (S320) and repeats the processing in step S210 and subsequent steps. On the other hand, if it is determined in step S300 that the storage media with the next lower IOPS limit does not exist, the structural ratio calculation program 360 presents a screen for prompting the user to purchase necessary storage media to the user (S310). Specifically speaking, if there is no storage media with the next lower IOPS limit next, the structural ratio calculation program 360 identifies the type and capacity of necessary storage media to calculate the ideal structure, which satisfies the IOPS distribution, and presents the screen for prompting the user to purchase such storage media to the user.

A method for identifying the necessary storage media in step 310 is to, for example, select the storage media with the lowest IOPS limit and calculate the ideal capacity, which sufficiently satisfies the IOPS, of the storage media selected based on the IOPS limit for such storage media. Next, the retained capacity of the selected storage media in the storage apparatus 600 is obtained and the retained capacity is subtracted from the ideal capacity, thereby calculating necessary capacity to be added. This calculation is repeated for all the types of storage media and the additional capacity of all the storage media is calculated. Then, the structural ratio calculation program 360 displays the additional capacity of all the storage media as a list of necessary storage media to be purchased on a display screen 1400 shown in FIG. 13.

Figure 13:
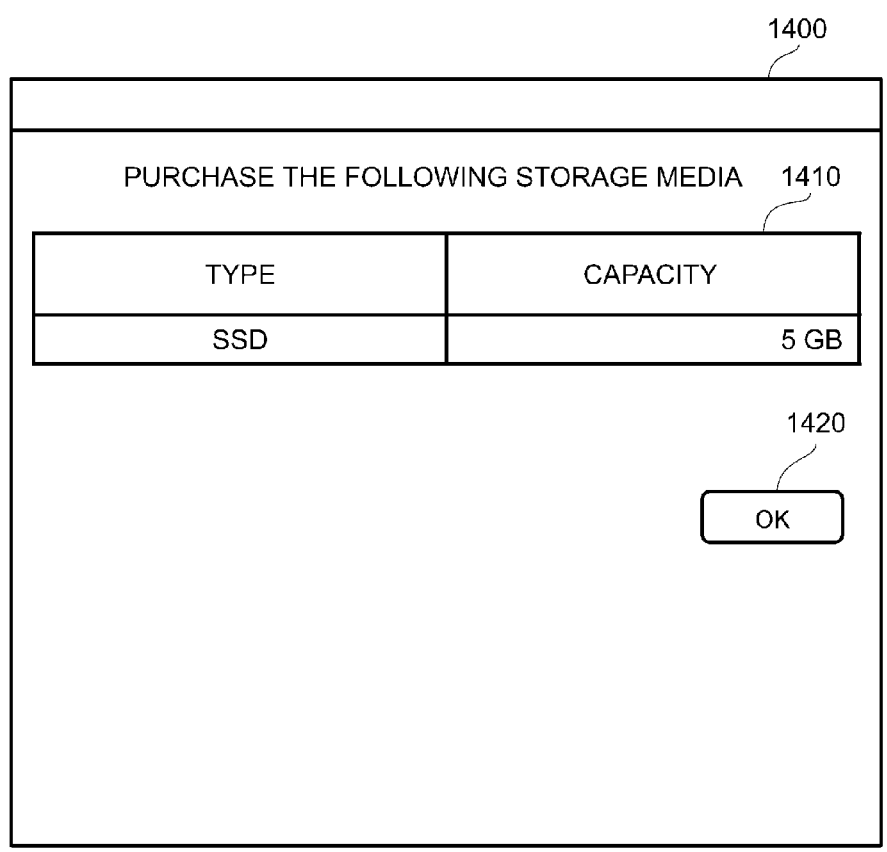
FIG. 13 is a conceptual diagram showing a display screen that prompts a user to purchase storage media according to the first embodiment.

The display screen 1400 shown in FIG. 13 is a screen for prompting the user to purchase necessary storage media and displays a sentence stating "Please purchase the following storage media" together with the type and capacity of the necessary storage media to be purchased. FIG. 13 shows that 5 GB of storage media whose type is SSD needs to be purchased.

Referring back to FIG. 10, after showing the screen for prompting the user to purchase the necessary storage media in step S310, the structural ratio calculation program 360 clears the content stored in the structural ratio information table 390 and terminates the processing because it cannot create the storage tiered which satisfies the IOPS distribution.

Figure 14:
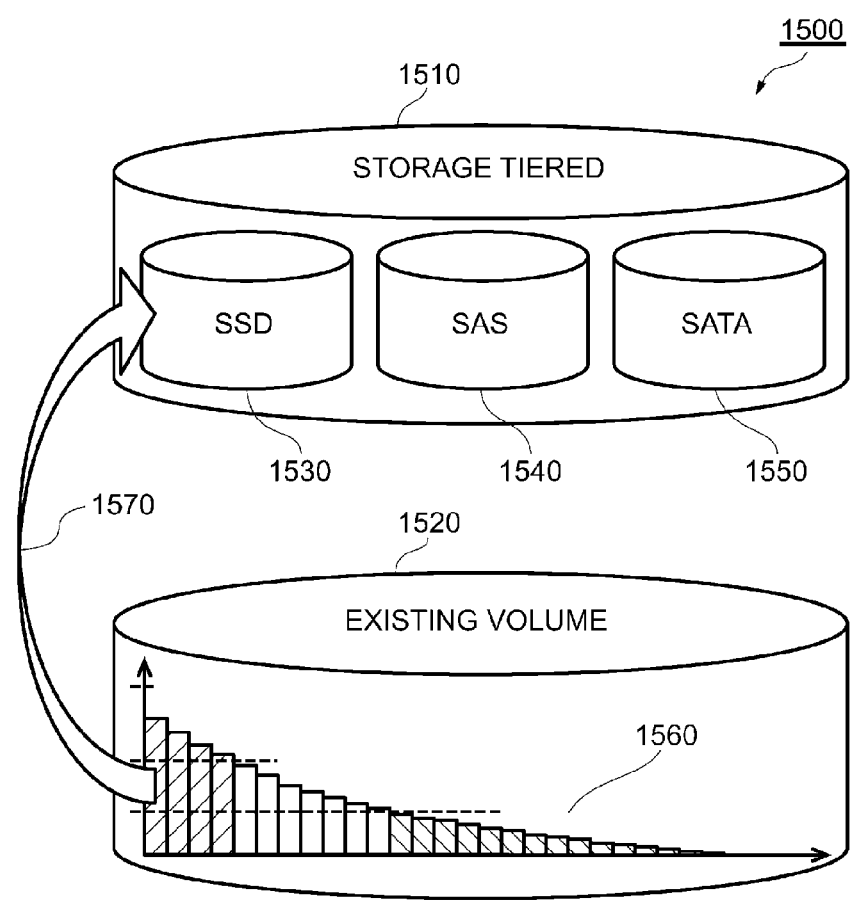
FIG. 14 is a conceptual diagram explaining data migration according to the first embodiment.

Next, migration from the existing volume 700 to the storage tiered will be explained. FIG. 14 shows that data of an existing volume 1520 is migrated to a storage tiered 1510 created by the above-described structural ratio calculation processing. The storage tiered 1510 is composed of storage media such as SSD 1530, SAS 1540, and SATA 1550. Data stored in the existing volume 1520 is indicated in IOPS distribution 1560 where the data is sorted in descending order of the IOPS. In this embodiment, data stored in the existing volume 1520 is migrated sequentially in descending order of the IOPS to the created storage tiered 1510. The data is sequentially written to the storage tiered 1510, starting from the SSD 1530 with the highest performance, by means of the storage tiered control function; and when the capacity of the SSD 1530 becomes filled with the data, the data is then written to the storage media of the SAS 1540 with the next higher performance. Furthermore, when the capacity of the SAS 1540 becomes filled with the data, the data is then written to the SATA 1550 with the next higher performance.

(1-4) Advantageous Effect of this Embodiment

According to this embodiment as described above, when adding a specified area of storage media to the existing volume 700 in response to a request from the host computer 500, the management computer 300: obtains the storage media information, including the I/O frequency of the data storage area (page) of the existing volume 700 as well as the performance information and structure information of the storage media, from the storage apparatus 600; identifies one or more storage media which have not been allocated to the existing volume 700 with the I/O performance in excess of the I/O frequency so that the data storage area of the existing volume 700 would achieve a specified I/O performance target; and issues an instruction to the storage apparatus to create a storage tiered by using the identified storage media. As a result, a storage tiered that satisfies the desired performance can be configured by recognizing the type and capacity of the storage media of the storage apparatus 600 held by the user and using such storage media.

(2) Second Embodiment

(2-1) Hardware Configuration of Computer System

Since the configuration of a computer system according to this embodiment is almost the same as that in the first embodiment, its detailed explanation has been omitted. Particularly, any difference in the configuration of this embodiment from that of the first embodiment will be explained below in detail. This embodiment describes a case where when switching from an existing virtual volume pool to a storage tiered, the structure of storage media to be added to the storage tiered is calculated. Since the configuration of the management computer 300 and the host computer 500 is almost the same as that in the first embodiment, its detailed explanation has been omitted.

(2-1-1) Configuration of Storage Apparatus

Figure 15:
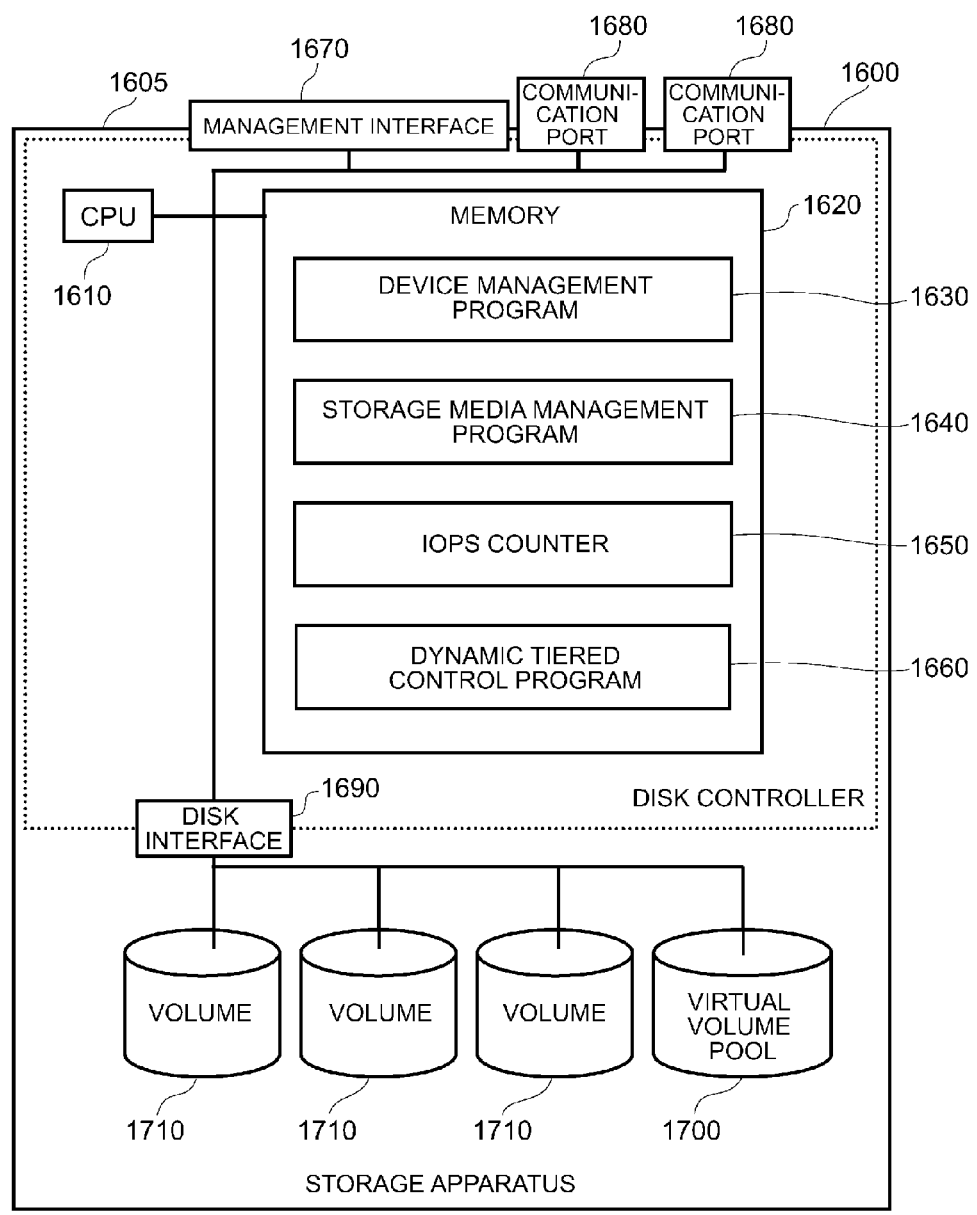
FIG. 15 is a block diagram showing a hardware configuration of a storage apparatus according to a second embodiment of the present invention.

The difference between a storage apparatus 1600 according to this embodiment and the first embodiment is that the storage apparatus 1600 is equipped with a virtual volume pool 1700 as shown in FIG. 15. The thin provisioning function presents a virtual volume to the host computer 500 as described earlier; and if the host computer 500 makes write access to the virtual volume, a storage area is dynamically allocated to the virtual volume. The virtual volume pool 1700 is a storage area allocated to this virtual volume and is a pool for a virtual volume(s). Data has already been written to the virtual volume pool 1700. Furthermore, the virtual volume pool 1700 is connected to a disk interface 1690. Since the configuration other than the virtual volume pool 1700 is the same as that of the first embodiment, its detailed explanation has been omitted.

(2-2) Structural Ratio Calculation Processing

Next, processing for calculating the structure of storage media to be added to the storage tiered when switching from the existing virtual volume pool 1700 to a new storage tiered will be explained. The storage media structure calculation processing is executed by the structural ratio calculation program 360 of the management computer 300. In the following explanation, the same step number is assigned to the processing of the same content as that of the structural ratio calculation processing according to the first embodiment and its detailed explanation has been omitted.

The structural ratio calculation processing according to this embodiment is executed by, for example, issuance of an instruction by the administrator to the structural ratio calculation program 360 of the management computer 300 to create a storage tiered based on the IOPS distribution of the virtual volume pool 1700.

Figure 18:
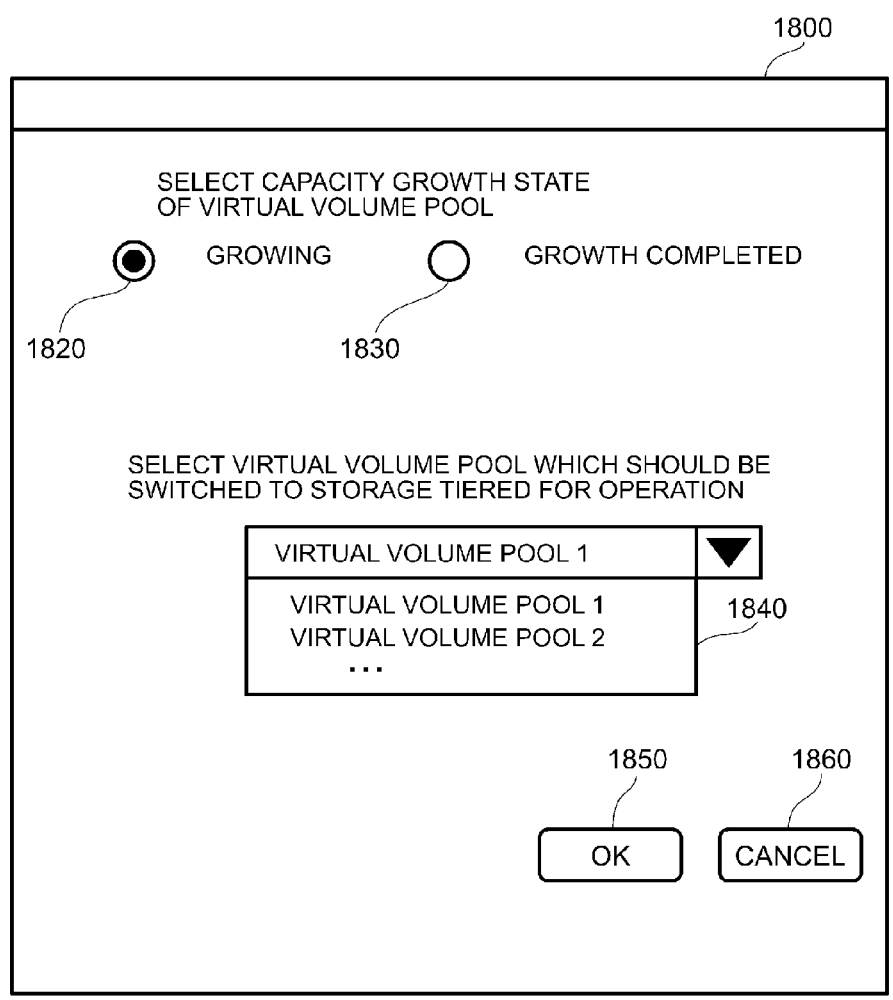
FIG. 18 is a conceptual diagram showing a storage tiered switching instruction screen according to the second embodiment.

For example, the storage tiered switching instruction is issued via a storage tiered switching instruction screen 1800. Now, the details of the storage tiered switching instruction screen 1800 will be explained. As shown in FIG. 18, the storage tiered switching instruction screen 1800 includes a radio button 1820 for selecting GROWING and a radio button 1830 for selecting GROWTH COMPLETED, which are radio buttons for selecting a capacity growth state of the virtual volume pool to be switched to the storage tiered, a selection box 1840 for selecting the virtual volume pool to be switched to the storage tiered, an OK button 1850 for commanding the execution of the processing, and a cancel button 1860 for terminating the screen without executing the processing.

The user checks if the capacity of the target virtual volume pool 1700 to be switched to the storage tiered is growing or not. If the capacity is growing, the user selects the radio button 1820 indicating that the capacity is growing; and if the growth is completed, the user selects the radio button 1830 indicating the growth completion. Furthermore, the user selects the target virtual volume pool to be switched to the storage tiered from the selection box 1840. The storage tiered switching instruction screen 1800 is designed so that the virtual volume pool is selected from the selection box 1840; however, identification information indicating the virtual volume pool 1700 may be directly entered.

Figure 16:
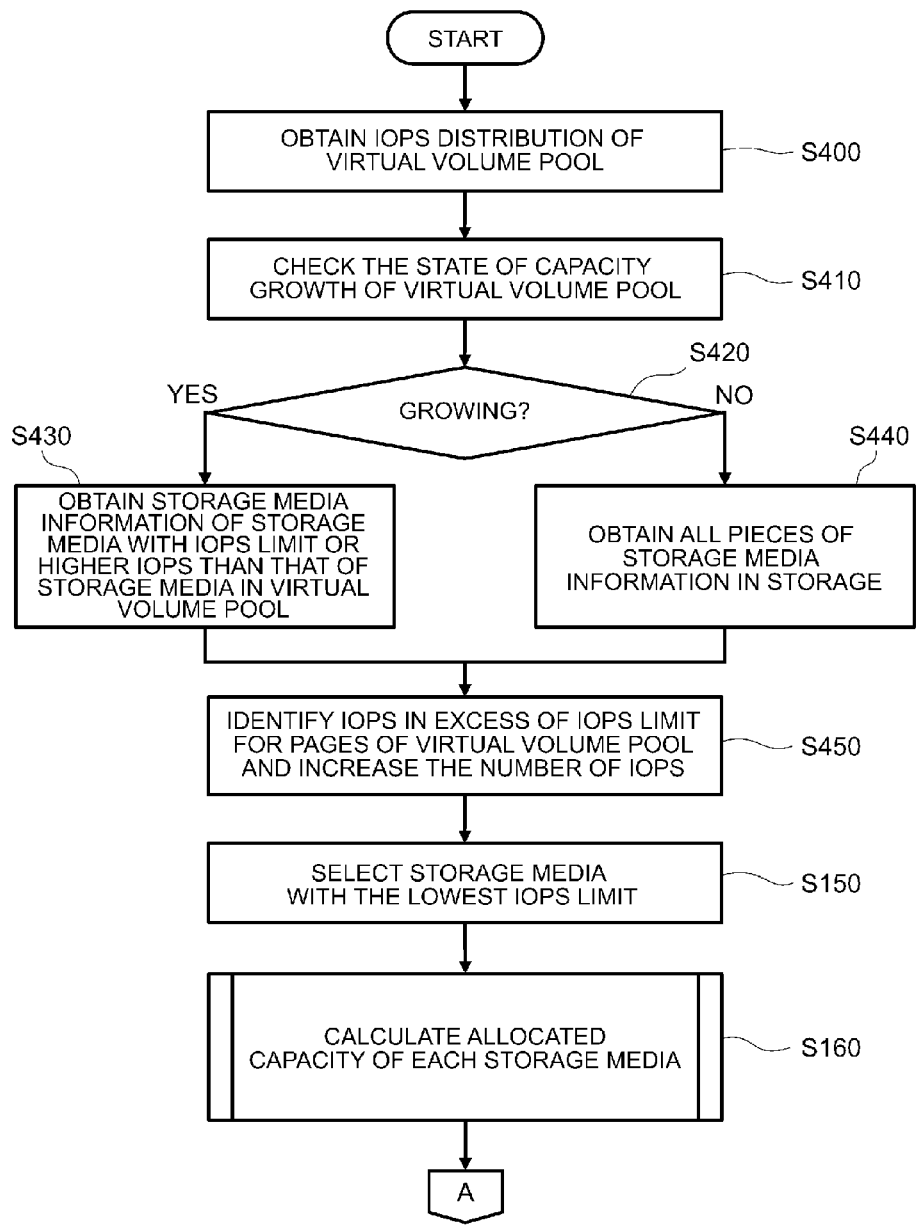
FIG. 16 is a flowchart illustrating a processing sequence for structural ratio calculation processing according to the second embodiment.

As shown in FIG. 16, the structural ratio calculation program 360 obtains the IOPS distribution of the virtual volume pool 1700 from the storage apparatus 1600 (S400). Specifically speaking, the structural ratio calculation program 360 issues an instruction to the dynamic tiered control program 660 of the storage apparatus 600 to obtain the IOPS information of the virtual volume pool 1700 and create the IOPS distribution.

Next, the structural ratio calculation program 360 obtains the information of the capacity growth state of the virtual volume pool 1700 from the host computer 500 (S410). The information about the capacity growth state is information to be obtained in order to judge whether the structure of an appropriate storage tiered should be created in accordance with the capacity growth state of the virtual volume pool 1700 at the time of switching to the storage tiered, or the structure of an appropriate storage tiered should be configured in accordance with the operation status such as extension or deletion of the pool.

Next, the structural ratio calculation program 360 judges the growth state of the virtual volume pool 1700 as obtained in step S410 (S420). If it is determined in step S420 that the capacity of the virtual volume pool 1700 is growing, the structural ratio calculation program 360 obtains only information of the storage media with the IOPS equal to or more than the IOPS limit for the storage media of the virtual volume pool 1700 (S430). On the other hand, If it is determined in step S420 that the capacity of the virtual volume pool 1700 is not growing, that is, the growth is completed, the structural ratio calculation program 360 obtains information of all the storage media in the storage apparatus 1600 (S440).

Next, the structural ratio calculation program 360 issues an instruction to the dynamic tiered control program 1660 of the storage apparatus 1600 to identify the IOPS in excess of the IOPS limit for the storage media of the virtual volume pool 1700 in the IOPS distribution obtained in step S400 and increase the number of IOPS (S450).

Then, the structural ratio calculation program 360 obtains the storage media with the lowest IOPS limit from among the information of the storage media obtained in step S110 (S150) and calculates the allocated capacity of the storage media selected in step S150 (S160).

Figure 17:
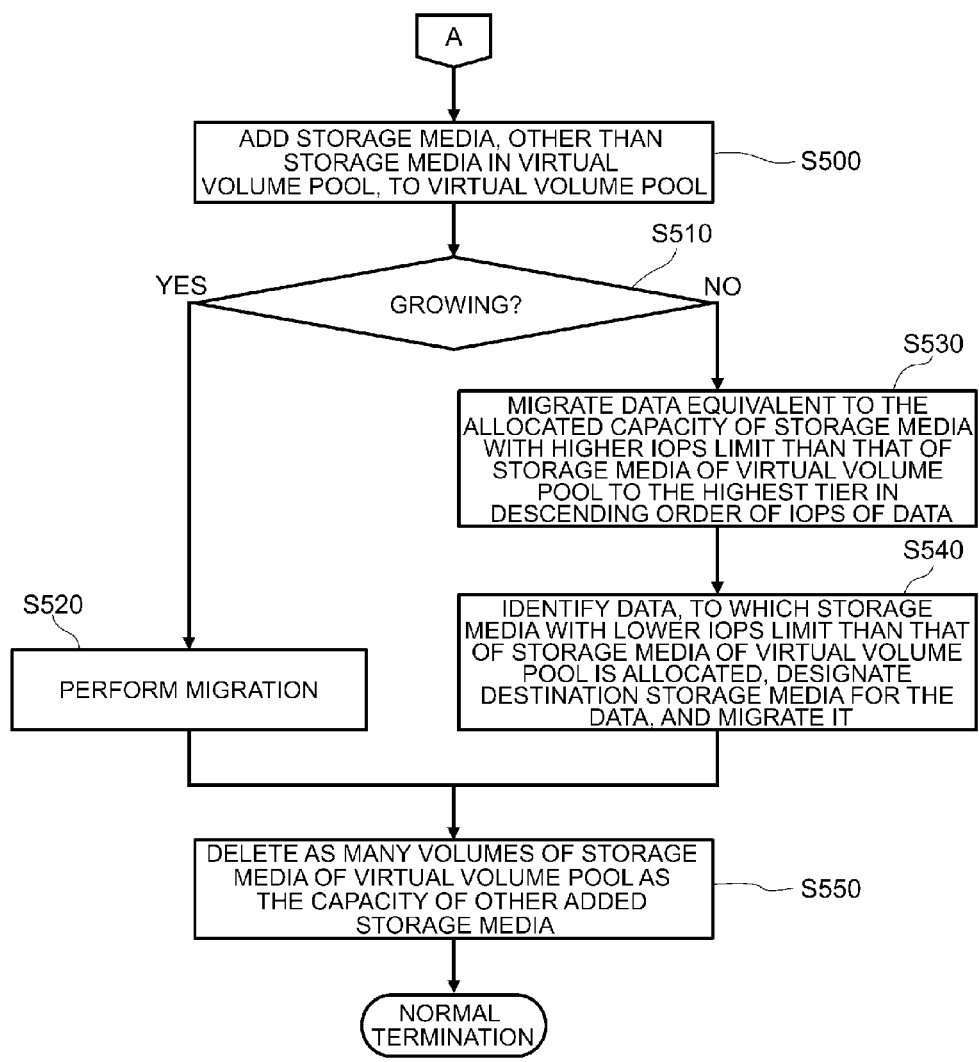
FIG. 17 is a flowchart illustrating a processing sequence for the structural ratio calculation processing according to the second embodiment.

Subsequently, as shown in FIG. 17, the structural ratio calculation program 360 gives an instruction to the device management program 1630 of the storage apparatus 1600 to refer to the structural ratio information table 390 and add storage media other than the storage media of the virtual volume pool 1700 to the virtual volume pool 1700, thereby creating the storage tiered (S500).

Next, the structural ratio calculation program 360 judges the growth state of the virtual volume pool 1700 obtained in step S410 again (S510).

If the growth state of the virtual volume pool 1700 indicates the growth completion in step S510, the structural ratio calculation program 360 sorts data according to the performance requirement and migrates the data by using the dynamic storage tiered control function that allocates pages of a high performance tier from data of high performance requirement (S520).

On the other hand, if the growth state of the virtual volume pool 1700 indicates in step S510 that the capacity is growing, the structural ratio calculation program 360 migrates data of the allocated capacity of the storage media with a higher IOPS limit than that of the storage media of the virtual volume pool 1700 to the highest-level tier in descending order of the IOPS of the data (S530).

After the completion of step S530, the structural ratio calculation program 360 identifies data, to which the storage media with a lower IOPS limit than that of the storage media of the virtual volume pool 1700 is allocated, and designates migration destination storage media for such data, thereby migrating the data (S540).

Next, in order to delete a storage area equivalent to the capacity of the added storage media, other than the storage media of the virtual volume pool 1700, from the virtual volume pool 1700, the structural ratio calculation program 360 migrates data stored in the storage media of the virtual volume pool 1700 to other volumes in the same storage media and deletes the emptied volume(s) (S550). This is normally the processing executed when the growth state indicates the growth completion. However, even if the growth state indicates that the capacity is growing, the screen for checking whether the relevant volume(s) should be deleted or not may be presented to the user and then the volume(s) may be deleted.

Figure 19:
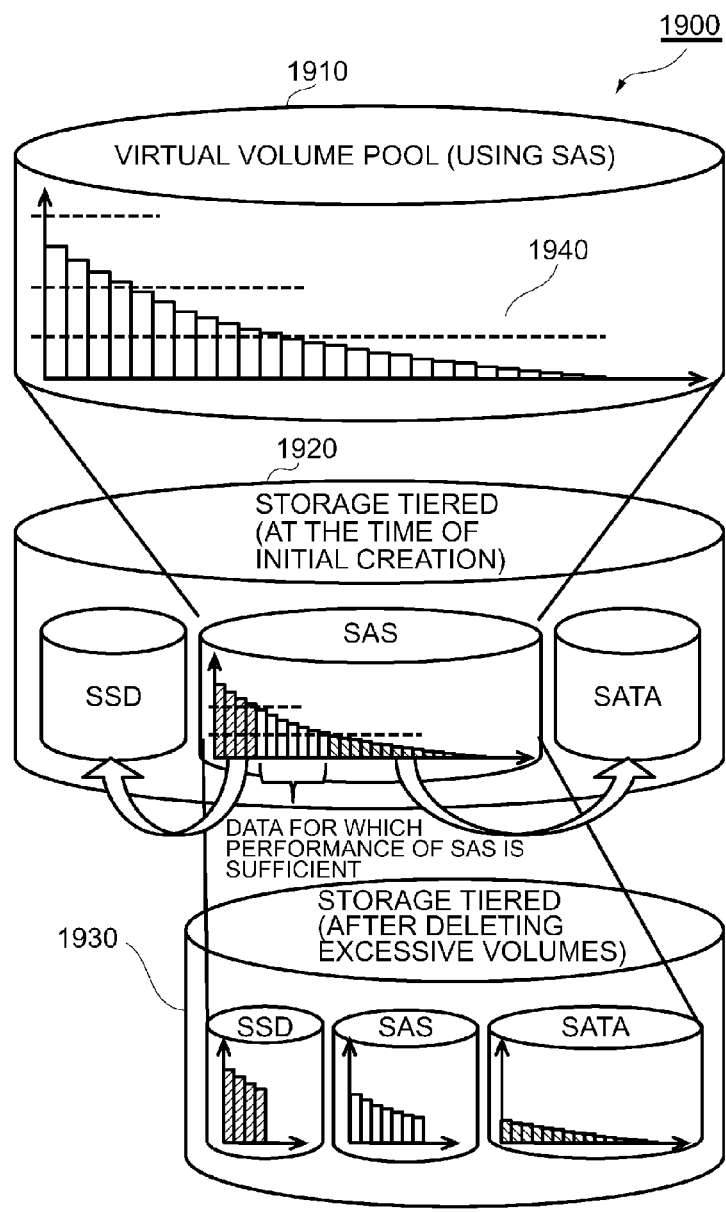
FIG. 19 is a conceptual diagram explaining data migration according to the second embodiment.

Next, migration executed when switching from the virtual volume pool 1700 to the storage tiered will be explained. FIG. 19 shows that data of a virtual volume pool 1910 is migrated to a storage tiered 1920 created by the above-described structural ratio calculation processing. Furthermore, FIG. 19 shows that the capacity growth of the virtual volume pool 1910 is completed and, for example, the storage tiered 1920 constituted from SSD, SAS and SATA is created by adding SSD and SATA to the virtual volume pool 1910 which is SAS. Then, the data of the virtual volume pool 1910 is migrated to the SSD and SATA of the created storage tiered 1920.

The data of the virtual volume pool 1910 is sorted in descending order of the IOPS of the data as described above, which results in IOPS distribution 1940. Then, the data equivalent to the allocated capacity of the SSD which is the storage media with a higher IOPS limit than that of the SAS, that is, the storage media of the virtual volume pool 1910, is migrated. After the data migration to the SSD is completed, data to which the SATA (which is the storage media with a lower IOPS limit than that of the SAS, that is, the storage media of the virtual volume pool 1910) is allocated is identified, the storage media which is a data migration destination is designated for such data, and then the data is migrated to the SATA. Furthermore, after the completion of the migration to the SATA, the data stored in the SAS is migrated to other volumes in the same SAS in order to delete the capacity of the added SSD and SATA which are the storage media other than the SAS, that is, the storage media of the virtual volume pool 1910. Then, a storage tiered 1930 from which the emptied volume(s) has been deleted is created and switching from the virtual volume pool 1910 to the storage tiered 1930 is completed.

(2-3) Advantageous Effect of this Embodiment

In this embodiment as described above, when a request is made by the host computer 500 to switch from a virtual volume pool to a storage tiered, data can be migrated to that storage tiered by creating a low-cost storage tiered using the storage media retained by the user on the basis of the IOPS distribution of the virtual volume pool.

(3) Third Embodiment

(3-1) Hardware Configuration of Computer System

Since the configuration of a computer system according to this embodiment is almost the same as that in the first and second embodiments, its detailed explanation has been omitted. Particularly, any difference in the configuration of this embodiment from that of the first and second embodiments will be explained below in detail. This embodiment describes a case where as triggered by the receipt of notice of the capacity depletion of a storage tiered, the management computer 300 obtains the capacity to be added to the storage tiered and calculates the structure of storage media with respect to the additional capacity. Since the configuration of the management computer 300 and the host computer 500 are almost the same as that in the first and second embodiments, its detailed explanation has been omitted.

Figure 20:
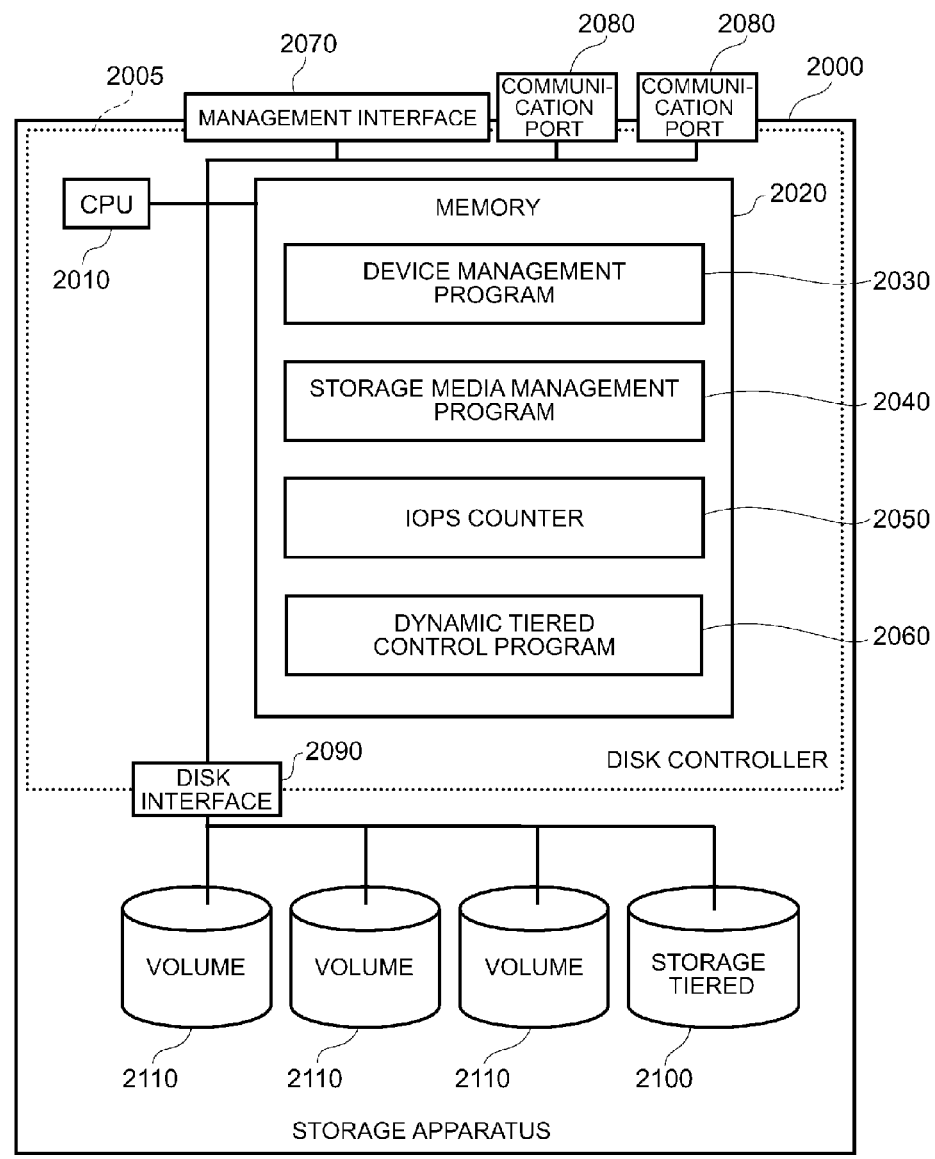
FIG. 20 is a block diagram showing a hardware configuration of a storage apparatus according to a third embodiment of the present invention.

The difference between a storage apparatus 2000 according to this embodiment and the first embodiment is that the storage apparatus 2000 is already equipped with a storage tiered 2100 as shown in FIG. 20. Data has already written to the storage tiered 2100. The storage tiered 2100 is also connected to a disk interface 2000. In a case of the capacity depletion of the storage tiered 2100, the storage apparatus 2000 notifies the management computer 300 of the depletion. Since the configuration other than the storage tiered 2100 is the same as that of the first embodiment, its detailed explanation has been omitted.

The management computer 300 obtains the capacity of the storage media of the storage tiered 2100 obtained by a dynamic tiered control program 2060 of the storage apparatus 2000. The capacity of the storage media of the storage tiered 2100 is stored in storage tiered information 2200. The storage tiered information table 2200 may be created by the management computer 300 based on information sent from the storage apparatus 2000 or the storage apparatus 2000 may create the storage tiered 2100 based on information of the capacity of the storage media and information of the storage tiered 2100 may be sent to the management computer 300.

The storage tiered information table 2200 is a table for managing the capacity of storage media of the storage tiered 2200 and is constituted from a tier column 2210, a storage media type column 2220, and a capacity column 2230 as shown in FIG. 21. The tier column 2210 stores information for identifying each tier. The storage media type column 2220 stores information of the type of storage media corresponding to each tier. Each tier capacity column 2230 stores information of the capacity of the storage media corresponding to each tier. Furthermore, a total capacity field 2240 stores the capacity of the entire storage tiered 2100.

(3-2) Structural Ratio Calculation Processing

Next, processing for calculating the structure of storage media of the capacity to be added to the existing storage tiered 2200 will be explained. The storage media structure calculation processing is executed by the structural ratio calculation program 360 of the management computer 300. In the following explanation, the same step number is assigned to the processing of the same content as that of the structural ratio calculation processing according to the first embodiment and its detailed explanation has been omitted.

The structural ratio calculation processing according to this embodiment is executed by, for example, the dynamic tiered control program 2060 of the storage apparatus 2000 as triggered by detection of depletion of the capacity of the storage tiered 2100 during monitoring such capacity and transmission of the detected content to the management computer 300.

Firstly, the structural ratio calculation program 360 receives the notice from the dynamic tiered control program 2060 of the storage apparatus 2000, reporting that the capacity of the storage tiered 2100 has exceeded a specified capacity threshold, which results in the capacity depletion (S560). Then, the structural ratio calculation program 360 obtains the additional capacity of the entire storage tiered from the storage tiered information table 2200 (S565).

The specified capacity threshold in step S560 or the additional capacity to be added to the storage tiered 2100 may be set in advance by input by the user. For example, the structural ratio calculation program 360 presents an input screen for the advance setting of the extension of the storage tiered 2100 to the user. The user can set the advance setting of the extension of the storage tiered 2100 via, for example, an input screen 2300 shown in FIG. 25. The input screen 2300 is used to directly enter a threshold for the capacity of the storage tiered 2100 or set the threshold for the capacity by means of another function, so that whether the capacity of the pool has been depleted or not is detected on the basis of the threshold and the used capacity. A policy for the capacity extension may be set in advance and the structure of storage media with respect to the additional capacity may be calculated according to the policy.

Figure 25:
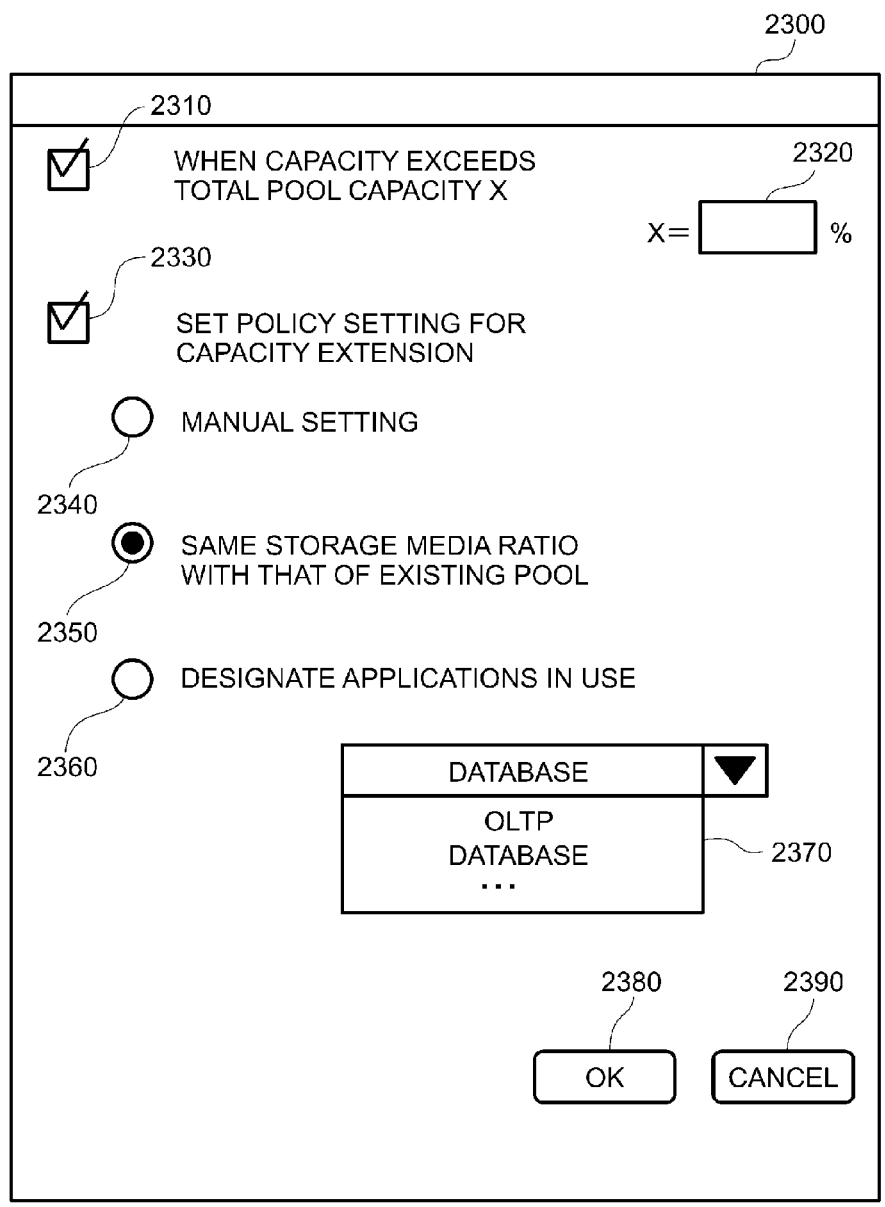
FIG. 25 is a conceptual diagram showing an input screen for advance settings according to the third embodiment.

As shown in FIG. 25, the input screen 2300 includes a setting item 2310 for setting a threshold for the capacity of the storage tiered, a text box 2320 for inputting a threshold value, a setting item 2330 for setting the capacity extension policy, and various radio buttons. Examples of the radio buttons include a radio button 2340 for manually selecting the setting content of the capacity extension policy, a radio button 2350 for selecting a structural ratio of the same storage media as that of the storage tiered in operation, and a radio button 2360 for selecting a method for designating an application(s) in use and adjusting to the characteristics of the application(s). The input screen 2300 also includes, for example, a selection box 2370 for selecting the application(s), an OK button 1850 for commanding the execution of the processing, and a cancel button 1860 for terminating the screen without executing the processing.

The user can set the threshold for the capacity of the storage tiered by inputting the threshold to the setting item 2320 on the input screen 2300. Furthermore, the user selects the capacity extension policy setting method by selecting various radio buttons. Also, when setting the capacity extension policy according to the characteristics of the application, the application to be used is selected from the selection box 2370. The structural ratio calculation program 360 obtains, for example, the threshold and the capacity extension policy setting method, which are entered via the input screen 2300, and calculates the structure of the capacity to be added to the storage tiered 2100 on the basis of the threshold and the setting method.

Referring back to FIG. 22, the structural ratio calculation program 360 obtains the IOPS information and IOPS distribution of the storage tiered 2100 from the storage apparatus 2000 (S570). Specifically speaking, the structural ratio calculation program 360 issues an instruction to the dynamic tiered control program 2060 of the storage apparatus 2000 to obtain the IOPS information of the storage tiered 2100 and create the IOPS distribution.

Subsequently, the structural ratio calculation program 360 refers to the storage media information table 370 and obtains information of the storage media in the storage apparatus 2000 (S110).

The structural ratio calculation program 360 then judges whether or not the user authority is set to the storage media obtained in step S110 (S120). If it is determined in step S120 that the user authority is set to the storage media, the structural ratio calculation program 360 obtains only information of the storage media to which the user authority is set (S130). On the other hand, if it is determined in step S120 that the user authority is not set to the storage media, the structural ratio calculation program 360 executes processing in step S140.

Then, the structural ratio calculation program 360 identifies the IOPS in excess of the IOPS limit for the existing volume 700 in the storage apparatus 600 and increases the number of IOPS (S140). Next, the structural ratio calculation program 360 obtains the storage media with the lowest IOPS limit from among the information of the storage media obtained in step S110 (S150).

Next, the structural ratio calculation program 360 calculates the allocated capacity of the storage media selected in step S150 (S575). The processing for calculating the allocated capacity of the storage media in step S575 will be explained later in detail.

Subsequently, the structural ratio calculation program 360 issues an instruction to a device management program 2030 of the storage apparatus 2000 to add the additional capacity of the storage media calculated in step S575 to the storage tiered 2100 (S580).

The structural ratio calculation program 360 may present the structure of the storage media to be added to the user before issuing the instruction to the storage apparatus 2000 to add the capacity to the storage tiered 2100. For example, the structural ratio calculation program 360 displays a display screen 2400 shown in FIG. 26 and presents the structure of the additional capacity of the storage tiered to the user. The display screen 2400 is a screen for presenting the storage media to be added to the storage tiered 2100 and the structure of the storage tiered 2100 after the addition to the user. The display screen 2400 includes a structure list 2410 of the storage media to be added to the storage tiered and a structure list 2420 of a storage tiered to be created after the addition. The display screen 2400 also includes an OK button 2430 for executing addition of the capacity to the storage tiered and a cancel button 2440 for terminating the screen without executing the addition of the capacity to the storage tiered.

The content to be displayed on the display screen 2400 may be designed so that the structure of the storage tiered is presented based on the structural ratio information table 390 by, for example, integrating several tiers in accordance with a constraint(s) of the dynamic tiered control.

Referring back to FIG. 22, the capacity growth state may be detected with respect to the capacity of the storage tiered 2100 and a judgment may be made according to the growth state in step S80 in the same manner as in the second embodiment. When the capacity growth state of the storage tiered 2100 indicates the growth completion, the migration processing shown in FIG. 16 and FIG. 17 is executed after step S580 and excessively allocated storage media in light of the ideal IOPS distribution are deleted.

Figure 23:
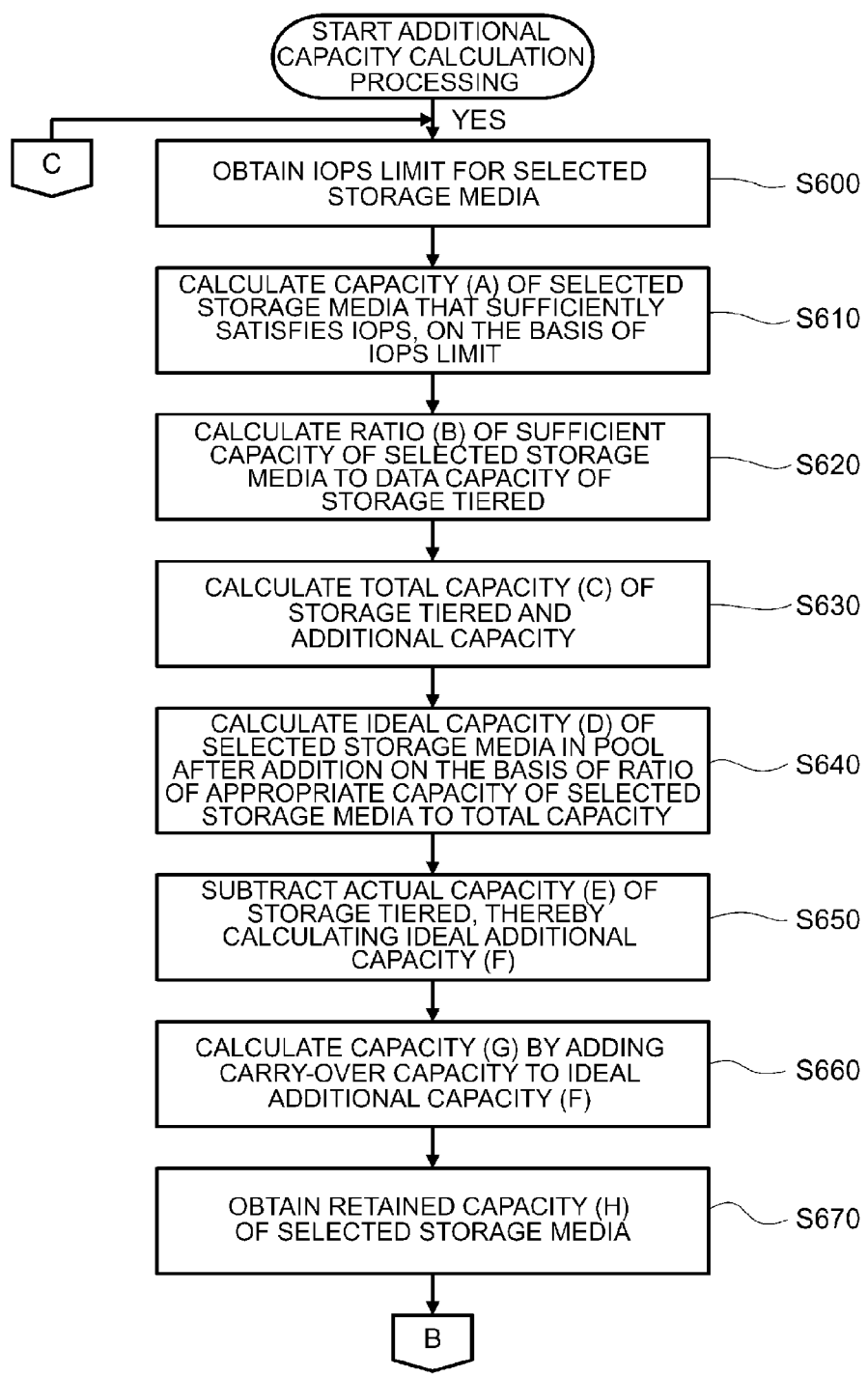
FIG. 23 is a flowchart illustrating a processing sequence for the structural ratio calculation processing according to the third embodiment.

Next, the details of the processing for calculating the allocated capacity of the storage media in step S575 will be explained. As shown in FIG. 23, the structural ratio calculation program 360 obtains the IOPS limit for the storage media selected in step S150 from the storage media information obtained in step S110 (S600).

Next, the structural ratio calculation program 360 calculates the ideal capacity of pages that sufficiently satisfies the IOPS of the storage media selected in step S150 on the basis of the IOPS distribution obtained in step S570 and the IOPS limit for the storage media obtained in step S610 (hereinafter referred to as the capacity (A)) (S610).

Next, the structural ratio calculation program 360 calculates a ratio of the ideal capacity of the selected storage media to the data capacity of the storage tiered (hereinafter referred to as the ratio (B)) (S620).

Then, the structural ratio calculation program 360 calculates the total capacity of the storage tiered and the additional capacity (hereinafter referred to as the total capacity (C)) (S630).

Subsequently, the structural ratio calculation program 360 calculates the ideal capacity of the selected storage media in the storage tiered 2100 after addition of the capacity (hereinafter referred to as the ideal capacity (D)) on the basis of the ratio of the appropriate capacity of the selected storage media to the total capacity (C) (S640).

Next, the structural ratio calculation program 360 subtracts the actual capacity of the storage tiered (hereinafter referred to as the actual capacity (DE)) from the ideal capacity (D), thereby calculating an ideal additional capacity (hereinafter referred to as the ideal additional capacity (F)) (S650).

Then, the structural ratio calculation program 360 calculates the capacity by adding carry-over capacity to the ideal additional capacity (F) calculated in step S650 (hereinafter referred to as the capacity (G)) (S660). The carry-over capacity herein used means the capacity calculated in step S720 described later; and when the retained capacity actually retained in the storage apparatus 2000 is insufficient as compared to the ideal additional capacity, such shortage is managed as the carry-over capacity to a lower-level tier.

Next, the structural ratio calculation program 360 obtains the retained capacity of the storage media selected in step S150 (hereinafter referred to as the retained capacity (H)) (S670).

Figure 24:
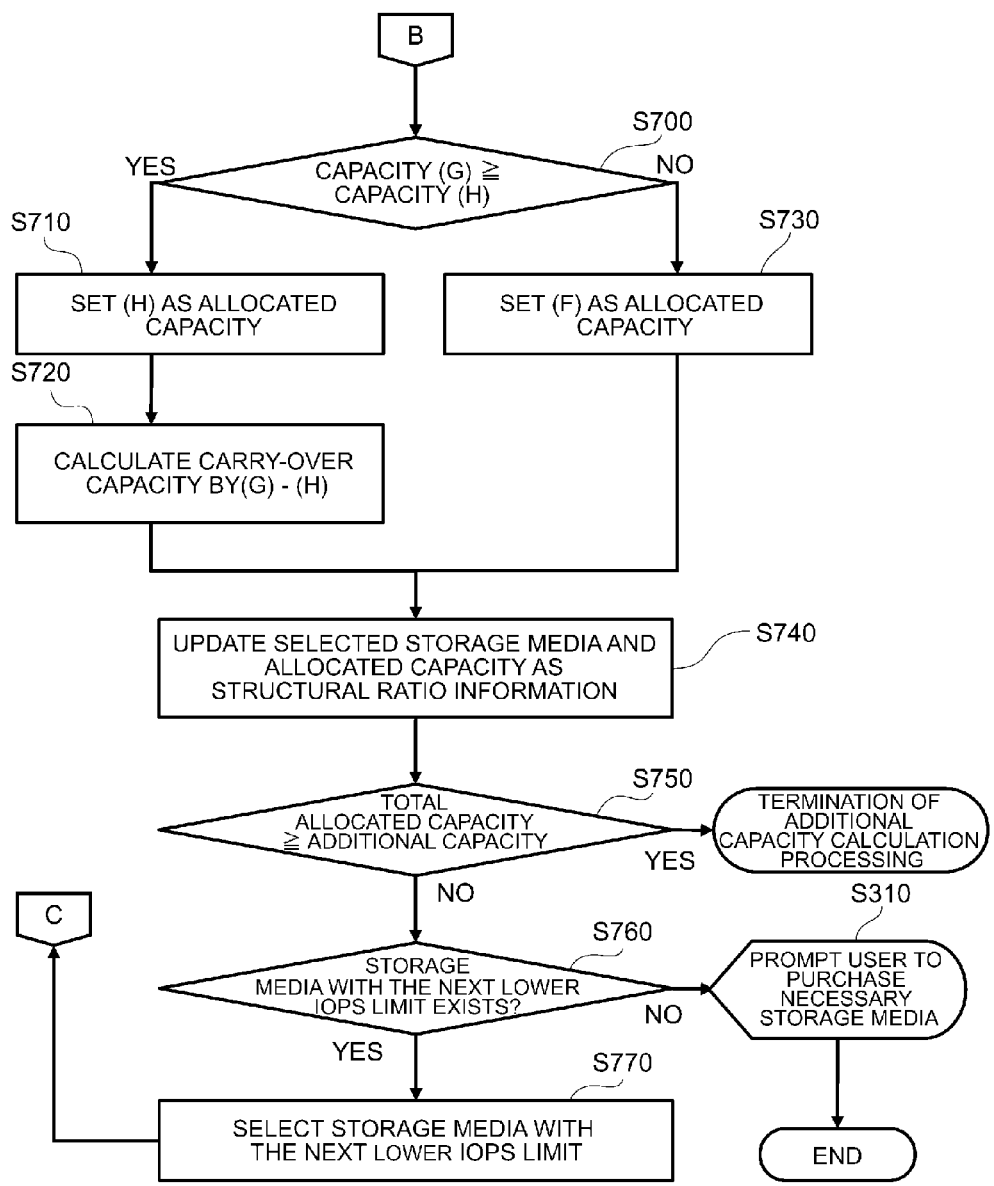
FIG. 24 is a flowchart illustrating a processing sequence for the structural ratio calculation processing according to the third embodiment.

Subsequently, as shown in FIG. 24, the structural ratio calculation program 360 compares the capacity (G) calculated in step S660 and obtained by adding the carry-over capacity with the retained capacity (H) obtained in step S670 (S700).

If it is determined in step S700 that the capacity (G) obtained by adding the carry-over capacity to the ideal additional capacity (F) is equal to or more than the retained capacity (F) of the storage media, the structural ratio calculation program 360 sets the retained capacity (H) of the storage media as the allocated capacity (S710). Then, the capacity obtained by subtracting the retained capacity (H) of the storage media from the capacity (G) obtained by adding the carry-over capacity to the ideal additional capacity (F) is set as the carry-over capacity (hereinafter referred to as the carry-over capacity (I)) (S720).

On the other hand, if it is determined in step S700 that the retained capacity (H) of the storage media is larger than the capacity (G) to which the carry-over capacity is added, the capacity (G) obtained by adding the carry-over capacity to the ideal additional capacity (F) is set as the allocated capacity (S730).

Next, the structural ratio calculation program 360 associates the allocated capacity of the storage media calculated in step S720 or step S730 with the selected storage media and stores them in the structural ratio information table 390 (S740).

Figure 22:
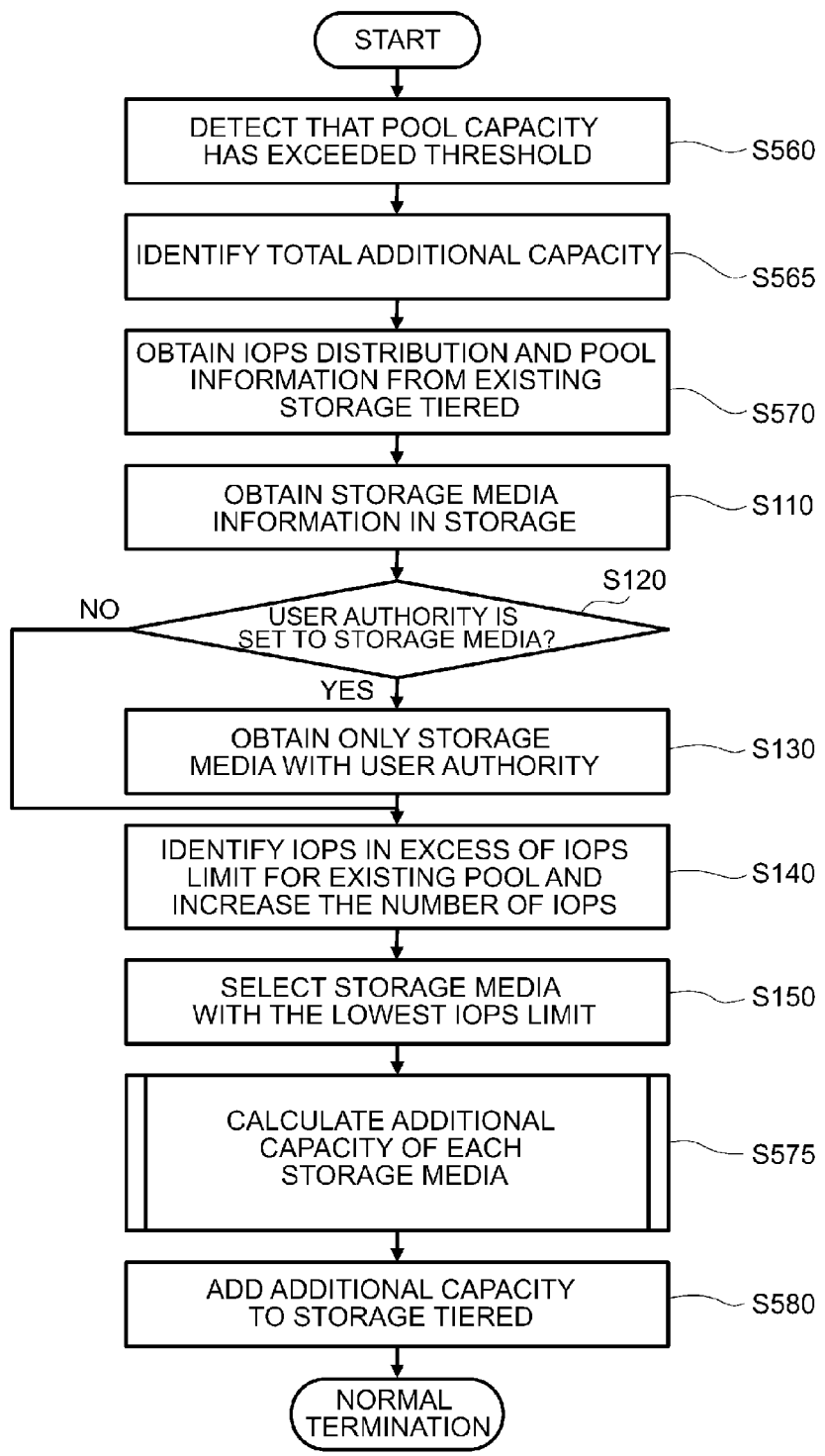
FIG. 22 is a flowchart illustrating a processing sequence for structural ratio calculation processing according to the third embodiment.

Then, the structural ratio calculation program 360 compares the capacity of the storage media which is written to the structural ratio information table 390 with respect to a page(s) to which the selected storage media is allocated, that is, a total of the allocated capacity (total allocated capacity), with the additional capacity requested for the storage tiered 2100 (S750); and if the total allocated capacity is equal to or more than the requested additional capacity, the structural ratio calculation program 360 terminates the processing in step S575 and executes the processing in step S580 in FIG. 22. On the other hand, if it is determined in step S750 that the total allocated capacity is less than the requested additional capacity, the structural ratio calculation program 360 executes processing in step S760.

Subsequently, the structural ratio calculation program 360 checks if the storage media with the next lower IOPS limit exists or not (S760). If it is determined in step S760 that the storage media with the next lower IOPS does not limit exist, the structural ratio calculation program 360 identifies the type and capacity of necessary storage media to satisfy the IOPS distribution, presents the screen for prompting the user to purchase the storage media (FIG. 13) to the user (S310), clears the content stored in the structural ratio information table 390, and terminates the processing. On the other hand, if it is determined in step S760 that the storage media with the next lower IOPS limit exists, the structural ratio calculation program 360 selects the storage media with the next lower IOPS (S770) and repeats the processing in step S600 and subsequent steps.

Regarding the method for calculating the ideal structure of the additional capacity, a calculation method on the basis that the IOPS distribution after adding the capacity to the storage tiered 2100 is similar to the IOPS distribution of the storage tiered in operation is used as described above from step S610 to step S650 for calculating the additional capacity of each storage media; however, the calculation method is not limited to such an example. For example, the ideal structure of the additional capacity may be calculated in accordance with the characteristics of the application(s) in use; and the processing step S610 to step S650 may not be executed as long as the ideal structure of the additional capacity can be calculated. Furthermore, the order of processing in step S575 may be different from the order described earlier by adopting another method.

Next, a specific example of the above-described processing for calculating the structure of the additional capacity of the storage media will be explained. Like the aforementioned structural ratio calculation processing, the specific example shown in FIG. 27 is also indicated on the basis that the IOPS distribution after addition of the additional capacity to the storage tiered 2100 is similar to the IOPS distribution of the storage tiered 2100 in operation.

An explanatory diagram 2500 in FIG. 27 describes a case where, for example, the capacity of SSD is 15 GB, the capacity of SAS is 55 GB, and the capacity of SATA is 30 GB; and the structural ratio calculation program 360 receives an instruction to add the capacity of 50 GB to a storage tiered with a total capacity of 100 GB. In this case, it is assumed that information of the storage media obtained from the storage apparatus 2000 is also SSD, SAS, and SATA. The specific example of the structural ratio calculation processing in a case of calculation of the structure of additional storage media which is SAS will be explained.

Firstly, 50 GB of SAS is calculated as the ideal capacity (A) from the IOPS distribution of the storage tiered 2100 in step S610 (2510). Next, in step S620, 50% of SAS is calculated as the ideal capacity ratio (B) (2520). Then, in step S630, 150 GB is calculated as the total capacity (C) of the storage tiered and the additional capacity (2530).

Subsequently, in step S640, 75 GB is calculated as the ideal capacity (D) of the SAS in the storage tiered 2100 after addition of the capacity on the basis of the appropriate capacity ratio of the SAS to the total capacity (C) (2540).

Next, 55 GB of the SAS is obtained as the actual capacity (E) of the storage tiered 2100 to be subtracted from the ideal capacity (D) calculated in step S640 (2550) and 20 GB of the SAS is calculated as the ideal additional capacity (F) (2560).

Then, 25 GB of the SAS is calculated as the capacity (G) obtained by adding 5 GB of the carry-over capacity from the SATA to the ideal additional capacity (F) calculated in step S650 (2570).

Next, 23 GB of the SAS is obtained as the retained capacity (H) of the selected storage media (2580). Then, the capacity (G) which is 25 GB of the SAS is compared with the retained capacity (H) which is 23 GB of the SAS; and since the capacity (G) is equal to or more than the retained capacity (H), the retained capacity (G) is set as the allocated capacity 23 GB of the SAS (2590).

Finally, if the capacity (G) is equal to or more than the retained capacity (H), a value 2 GB obtained by subtracting the retained capacity (H) from the capacity (G) is calculated as the capacity (I) to be carried over to the SSD (2600).

(3-3) Advantageous Effect of this Embodiment

In this embodiment as described above, as triggered by the reception of the notice of the capacity depletion of the storage tiered 2100 from the dynamic tiered tontrol program 2060 of the storage apparatus 2000, the capacity to be added to the storage tiered 2100 can be obtained and the low-cost structure using the storage media held by the user can be calculated with respect to the additional capacity.

(4) Fourth Embodiment (4-1) Hardware Configuration of Computer System

In this embodiment, a storage tiered is newly created based on the IOPS distribution of an existing logical volume in a storage apparatus in the same manner as in the first embodiment. In this embodiment, an externally connected storage apparatus exists besides storage media in the storage apparatus; and the structure of the storage tiered is calculated by externally connecting a logical volume in this external storage apparatus and using storage media information of the externally connected volume. The external connection herein used means a function that associates a logical volume, which is provided by another storage apparatus (external storage apparatus) connected to one storage apparatus, with a logical volume or a virtual volume provided by the one storage apparatus. In the following explanation, associating a logical volume of another storage apparatus with a logical volume of its own storage apparatus may be sometimes explained simply as external connection.

Figure 28:
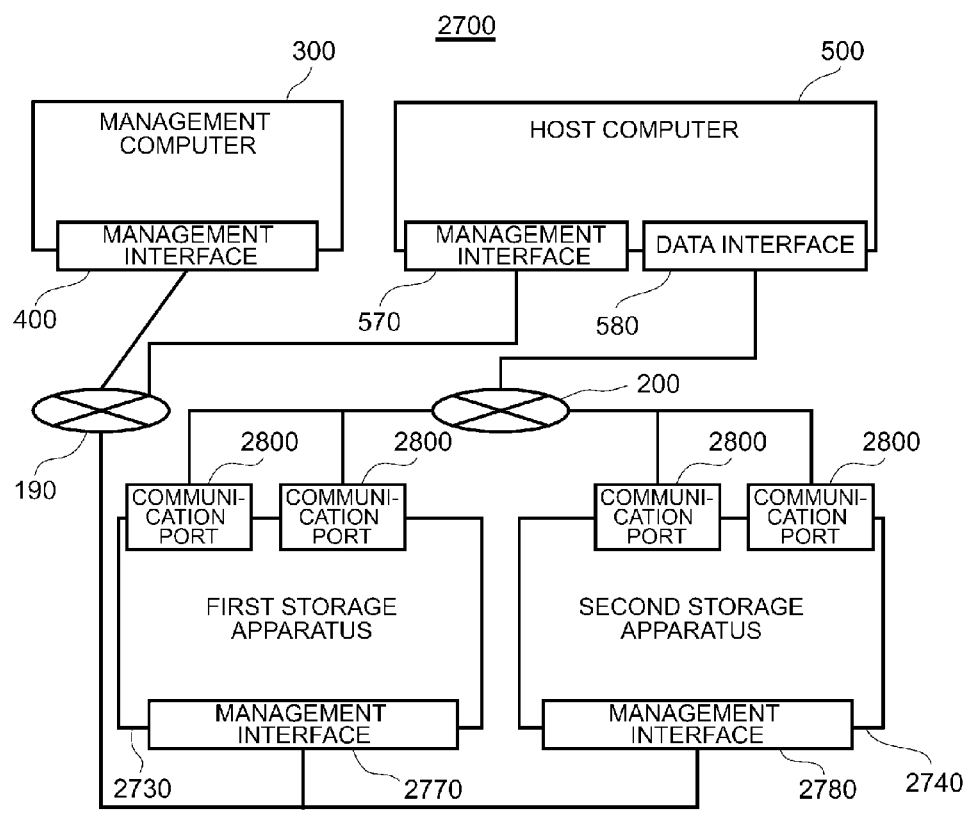
FIG. 28 is a block diagram of a hardware configuration of a computer system according to a fourth embodiment of the present invention.

As shown in FIG. 28, a computer system 2700 according to this embodiment is constituted from, for example, a first storage apparatus 2730, a second storage apparatus 2740, a management computer 300, and a host computer 500.

A management interface 2780 for the second storage apparatus 2740 is connected to the management computer via a specified management network (for example, LAN) 190. Consequently, the management computer 300 can communicate with the second storage apparatus 2740. Incidentally, if the management network 190 is a LAN, each management interface 2780 can be, for example, a LAN card.

Furthermore, a communication port 2810 of the second storage apparatus 2740 is connected to the host computer 500 via a specified data communication network (for example, SAN) 200. Consequently, the second storage apparatus 2740 can communicate with the host computer 500.

Since the configuration of the management computer 300 and the host computer 500 according to this embodiment is the same as that of the management computer 300 and the host computer 500 according to the first embodiment, its detailed explanation has been omitted.

(4-2) Configuration of Storage Apparatus

Next, the configuration of the first storage apparatus 2730 and the second storage apparatus 2740 will be explained. Since the first storage apparatus 2730 and the second storage apparatus 2740 have almost the same configuration, only the configuration of the first storage apparatus 2730 will be explained.

Figure 29:
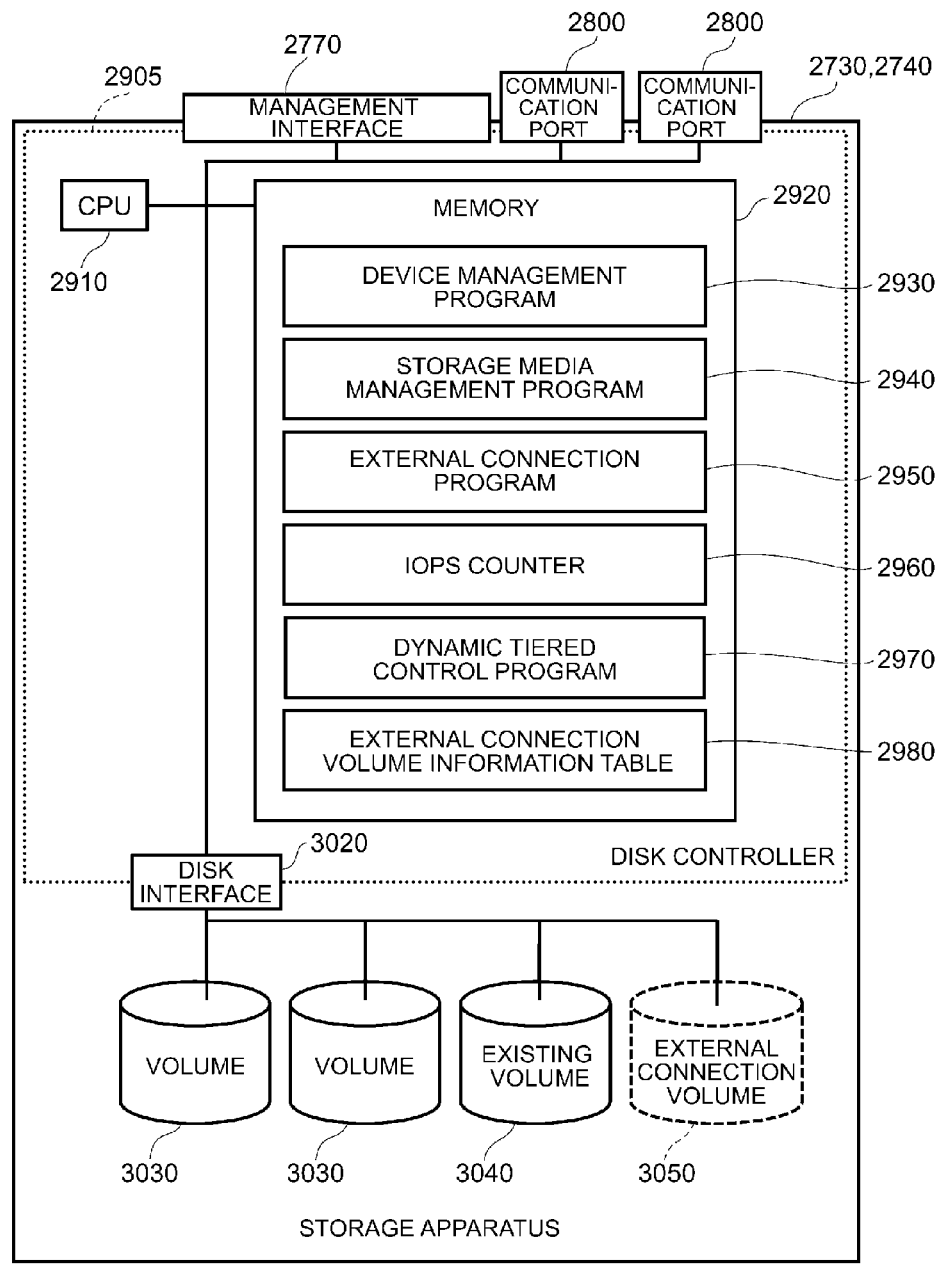
FIG. 29 is a block diagram showing the configuration of a storage apparatus according to the fourth embodiment.

As shown in FIG. 29, the first storage apparatus 2730 is constituted from, for example, a disk controller 2905, volumes 3030, an existing volume 3040, and an external connection volume 3050. In the following explanation, particularly the difference in the configuration from the storage apparatus 600 according to the first embodiment will be explained in detail.

A memory 2920 for the disk controller 2905 stores, for example, a device management program 2930, a storage media management program 2940, an external connection program 2950, an IOPS counter 2960, a dynamic tiered control program 2970, and an external connection volume information table 2980.

Since the device management program 2930, the device management program 2930, the storage media management program 2940, the IOPS counter 2960, and the dynamic tiered control program 2970 have almost the same functions as those of the device management program 630, the storage media management program 640, the IOPS counter 650, and the dynamic tiered control program 660 according to the first embodiment, its detailed explanation has been omitted.

After receiving an instruction from the structural ratio calculation program 360 of the management computer 300, the external connection program 2950 detects a storage apparatus which can be externally connected to the first storage apparatus 2730, obtains volume information of the detected storage apparatus, and externally connects that storage apparatus to the first storage apparatus 2730.

The external connection volume information table 2980 is a table for managing information of an externally connected logical volume(s) and is constituted from a storage column 2981, a storage media type column 2982, a capacity column 2983, and an IOPS limit column 2984 as shown in FIG. 30. The storage column 2981 stores an identifier or name of a storage apparatus which can be externally connected to the first storage apparatus 2730 and in which a logical volume that can be externally connected exists. The storage media type column 2982 stores information indicating the type of storage media of logical volumes which can be externally connected and belongs to each storage apparatus. However, there may be a case where the storage media type cannot be identified, depending on a storage apparatus to be externally connected. So, if the storage media type cannot be recognized, a hyphen is stored in the storage media type column 2982.

Furthermore, the capacity column 2983 stores the capacity of each storage media. The IOPS limit column 2984 stores the maximum number of IOPS per page that can be processed by each storage media. The IOPS limit may be a predefined value or a value counted by the IOPS counter 2960 after actual transmission of test I/O by the device management program 2930 to the external connection volume 3050. Furthermore, external connection volume information 3100 may be information of logical volumes existing in the storage apparatus which can be externally connected when extending the capacity, or information of an external connection volume(s) already mapped in the first storage apparatus. However, if the external connection volume information 3100 is the information of the logical volume(s) existing in the storage apparatus which can be externally connected, the information of the already mapped external connection volume(s) can be obtained at the same time when obtaining the storage media information in the storage apparatus.

Next, a storage media information table 3200 of the management computer 300 will be explained. The storage media information table 3200 is almost the same as the storage media information table 370 shown in FIG. 1, but the difference between them is that the storage media information table 3200 also stores information about externally connected volumes. In other words, the storage media information table 3200 is information obtained by integrating the external connection volume information table 3100 of the above-described first storage apparatus 2730 with the storage media information of the first storage apparatus 2730.

The storage media information table 3200 is constituted from a tier order column 3210, a storage media type column 3220, a capacity column 3230, an IOPS limit column 3240, an externally connected storage media type column 3250, and a use authority column 3260 as shown in FIG. 31.

The tier order column 3210 stores information indicating the tier order of storage media. The storage media type column 3220 stores information indicating the type of the storage media, for example, "SSD" or "SAS15K." The capacity column 3230 stores information indicating the capacity of each storage media. The IOPS limit column 3240 stores information indicating the IOPS limit for each storage media. The IOPS limit is the maximum number of IOPS per page which can be processed by each storage media. The information stored in the IOPS limit column 3704 may be a predefined value or a value counted by the IOPS counter 2960 after actual transmission of test I/O by the device management program 2930 of the first storage apparatus 2730 to the existing volume 3040. The externally connected storage media type column 3250 stores the type of storage media of the externally connected volume. However, there may be a case where the storage media type cannot be identified, depending on a storage apparatus to be externally connected. So, if the storage media type cannot be recognized, a hyphen is stored in the externally connected storage media type column 3250. The use authority column 3705 stores information indicating the use authority of each user over each storage media. In the environment where the use authority is set to each storage media, for example, user A can select storage media to use only from an aggregate of storage media over which the user authority is granted to user A. Regarding an external connection volume, it is mapped to the first storage apparatus 2730 and the use authority is then set to that external connection volume.

(4-3) Structural Ratio Calculation Processing

Next, processing for calculating the structure of the storage tiered based on the IOPS distribution when the storage media information including a volume(s) which can be externally connected is included. The storage media structure calculation processing is executed by the structural ratio calculation program 360 of the management computer 300. In the following explanation, the same step number is assigned to the processing of the same content as that of the structural ratio calculation processing according to the first embodiment and its detailed explanation has been omitted.

The structural ratio calculation processing according to this embodiment is executed by, for example, the administrator giving an instruction to the structural ratio calculation program 360 of the management computer 300 to create a storage tiered based on the IOPS distribution of the existing volume 3040.

Figure 32:
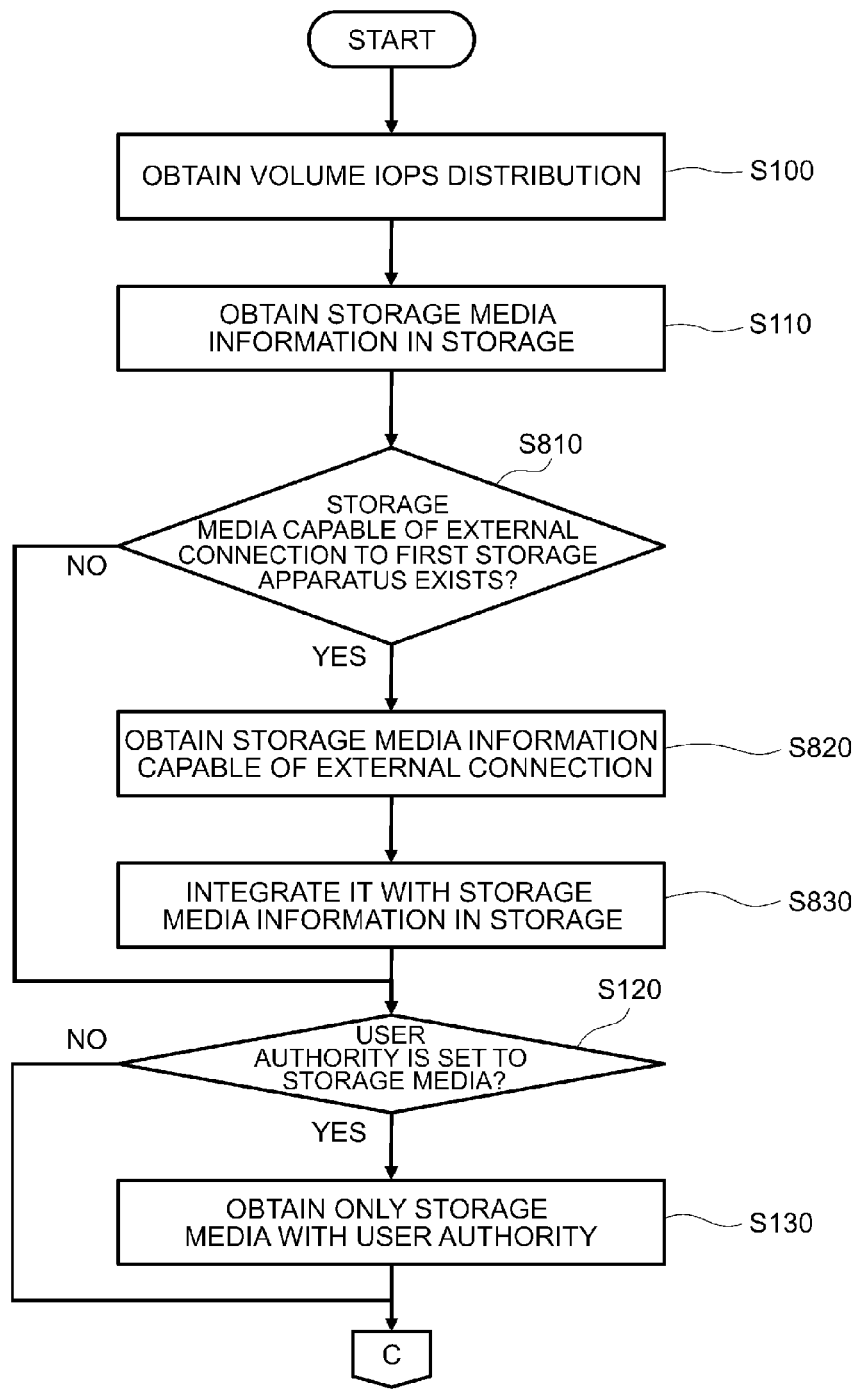
FIG. 32 is a flowchart illustrating a processing sequence for structural ratio calculation processing according to the fourth embodiment.
Figure 33:
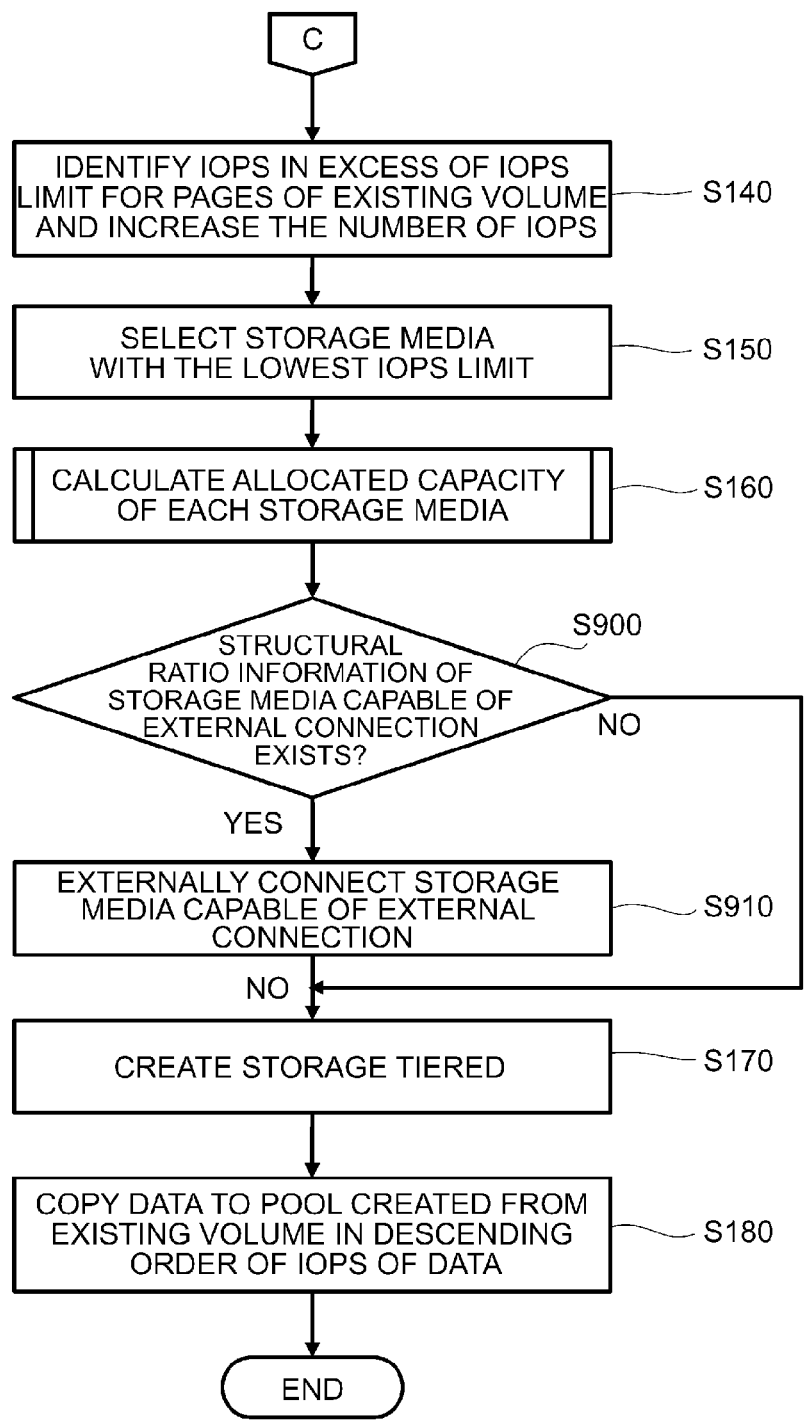
FIG. 33 is a flowchart illustrating a processing sequence for structural ratio calculation processing according to the fourth embodiment.

As shown in FIG. 32, the structural ratio calculation program 360 firstly obtains the IOPS distribution of the existing volume 3040 from the first storage apparatus 2730 (S100). Next, the structural ratio calculation program 360 refers to the storage media information table 3200 and obtains the storage media information of the first storage apparatus 2730 (S110).

Next, the structural ratio calculation program 360 checks with the external connection program 2950 of the first storage apparatus 2730 if any volume that can be externally connected exists in the second storage apparatus 2740 which can be externally connected (S810).

If it is determined in step S810 that a volume which can be externally connected exists in the second storage apparatus 2740, the structural ratio calculation program 360 obtains information of the storage media which can be externally connected (S820). Then, the structural ratio calculation program 360 stores the information obtained in step S820 in the storage media information table of the first storage apparatus 2730 (S830). On the other hand, if it is determined in step S810 that a volume which can be externally connected does not exist in the second storage apparatus 2740, the structural ratio calculation program 360 executes the processing in step S120.

Then, the structural ratio calculation program 360 judges whether the user authority is set to the storage media obtained in step S110 and step S810 (S120). If it is determined in step S120 that the user authority is set to the storage media, the structural ratio calculation program 360 obtains only information of the storage media to which the user authority is set (S130). On the other hand, if it is determined in step S120 that the user authority is not set to the storage media, the structural ratio calculation program 360 executes the processing in step S140.

Next, the structural ratio calculation program 360 identifies the IOPS in excess of the IOPS limit for the existing volume 700 in the storage apparatus 600 and increases the number of IOPS (S140). Then, the structural ratio calculation program 360 obtains the storage media with the lowest IOPS limit from among the information of the storage media obtained in step S110 (S150). Subsequently, the structural ratio calculation program 360 calculates the allocated capacity of the storage media selected in step S150 (S160).

Then, the structural ratio calculation program 360 judges whether an external connection volume is included in the structural ratio information table 390 or not (S900). If it is determined in step S900 that an external connection volume is included in the structural ratio information table 390, the volume which can be externally connected is externally connected to the first storage apparatus 2730 (S910). If it is determined in step S900 that an external connection volume is not included in the structural ratio information table 390, the structural ratio calculation program 360 executes the processing in step S170.

Next, the structural ratio calculation program 360 creates a storage tiered based on the calculation result in step S160 (S170). Then, the structural ratio calculation program 360 copies data in descending order of the IOPS of the data, starting from the highest IOPS, to the storage tiered created in step S170 (S180). Incidentally, if there is a specified constraint(s) on the tier number representing the performance of the relevant tier in the storage tiered for the processing for creating the storage tiered which satisfies the above-described I/O frequency distribution, the structural ratio calculation program 360 may construct a tier with the performance equivalent to or higher than that of the tier number corresponding to the relevant constraint. Furthermore, If there is a specified constraint(s) on the number of storage media constituting a storage tier with respect to the processing for creating the storage tiered which satisfies the above-described I/O frequency distribution, the structural ratio calculation program 360 may select the storage media as many as or less than the number of storage media corresponding to the constraint.

(4-4) Advantageous Effect of this Embodiment

If the host computer 500 issues a request to create a storage tiered and a volume which can be externally connected is included in the storage media held by the user, a low-cost storage tiered can be created according to this embodiment as described above.

INDUSTRIAL APPLICABILITY

The present invention can be applied to a wide variety of computer systems that configure a storage tiered by using storage media held by a user.

REFERENCE SIGNS LIST

100 Computer system
190 Management network
200 Data communication network
300 Host computer
310 Input device
320 Output device
330 Processor
340 Disk device
350 Memory
360 Structural ratio calculation program 370 Storage media information table
380 IOPS information table
390 Structural ratio information table
600 Storage apparatus
605 Disk controller
610 Processor
620 Memory
630 Device management program
640 Storage media management program
650 Counter
660 Dynamic tiered control program

The invention claimed is:

1. A computer system comprising a storage apparatus, a host computer requesting writing of data to the storage apparatus, and a management computer configured to manage the storage apparatus and the host computer, wherein the storage apparatus, the host computer, and the management computer are connected to each other using a network, wherein the storage apparatus includes:
a plurality of kinds of storage media with different I/O performance; and
a control unit configured to manage storage areas, which are provided by the plurality of kinds of storage media with the different I/O performance, as storage tiers; wherein the control unit is configured to allocate a storage area from the storage tiers to a data storage area of a volume or volumes storing the data in response to a request from the host computer to write the data, to obtain I/O frequency information of the data stored in the volume or volumes, and to provide the I/O frequency information to the management computer;

wherein the management computer includes:
a storage unit configured to store a pool structure information table for managing structure information of the storage tiers; and
a control unit configured to manage the structure of the storage tiers of the storage apparatus; and wherein the control unit is configured to obtain storage media information, including the I/O frequency of data stored in the volume or volumes, as well as structure information and the I/O performance of the storage media, from the storage apparatus, to identify a storage area of storage media with low I/O performance, which are not allocated to any of the volumes, from among the storage media with higher I/O performance than the I/O frequency of the data stored in the volume or volumes, on a basis of the structure information of the storage media, and to issue an instruction to the storage apparatus to create the storage tiers by using a storage area of the identified storage media.

2. The computer system according to claim 1, wherein the control unit for the management computer obtains is configured to obtain the I/O frequency of the data based on designated I/O frequency distribution.

3. The computer system according to claim 2, wherein when the capacity of the storage media identified from the structure information of the storage media is less than the calculated capacity constituting the storage tiers, the control unit for the management computer is configured to identify the storage media with the next lower I/O performance based on the structure information of the storage media and to calculate a capacity that satisfies the I/O frequency with the I/O performance.

4. The computer system according to claim 3, wherein when migrating data in the data storage area of an existing storage tier to the storage tiers to be newly created for which the creation instruction has been issued, the control unit for the management computer is configured to migrate the data, in descending order of the I/O frequency of the data, to the storage tiers to be newly created for which the creation instruction has been issued.

5. The computer system according to claim 4, wherein the I/O frequency distribution corresponding to the I/O frequency information of the data storage area provided from the storage apparatus includes the data storage area with higher I/O frequency than the I/O performance of the storage media, and the control unit for the management computer is configured to increase that I/O frequency of the data storage area by a specified value and to allocate the storage area with the I/O performance equal to or higher than the I/O performance of the storage media.

6. The computer system according to claim 5, wherein when the capacity of the data storage area corresponding to the I/O frequency distribution has already been calculated with regard to the storage media included in the storage media information, but the capacity of the data storage area corresponding to the I/O frequency distribution cannot be satisfied with the storage media of the storage apparatus, the control unit for the management computer is configured to display a screen clearly specifying the storage media of the storage apparatus, which is short of capacity and cannot satisfy the capacity of the data storage area corresponding to the I/O frequency distribution of the storage media, on a display screen.

7. The computer system according to claim 6, wherein when there is a certain constraint on a tier number representing the performance of the relevant tier in the storage tiers when creating the storage tiers which satisfies the I/O frequency distribution, the control unit for the management computer is configured to select the storage media which constitute a tier having performance equal to or higher than that of the tier corresponding to the constraint.

8. The computer system according to claim 6, wherein when there is a certain constraint on the number of storage media constituting a storage tier when creating the storage tiers which satisfy the I/O frequency distribution, the control unit for the management computer is configured to select the storage media as many as or less than the number of tiers corresponding to the constraint.

9. The computer system according to claim 1, wherein the volume is a virtual volume to which a storage area is allocated when data are written from the host computer, and the control unit for the management computer is configured to obtain information indicating whether a capacity of a pool in which the storage area is allocated from the host computer to the data storage area of the volume is increasing or not.

10. The computer system according to claim 9, wherein when the information of a growth state of the pool indicates that the capacity is growing, the control unit for the management computer is configured to obtain only the storage media information of the storage media whose I/O performance is equal to or higher than the I/O performance of the storage media constituting the pool.

11. The computer system according to claim 10, wherein when migrating data of the pool to the storage tiers to be newly created for which the creation instruction has been issued to the storage apparatus, the control unit for the management computer is configured to migrate the data of the pool in descending order of the I/O frequency of the data to the storage media of a highest-level tier and to terminate the migration of the data when all the storage media with higher I/O performance than that of the storage media of the pool are allocated to the storage tiers.

12. The computer system according to claim 11, wherein when a capacity of the storage tiers in which data are not stored is larger than a specified capacity when migrating the data to the storage tiers, the control unit for the management computer is configured to migrate data stored in the storage media of the pool to another volume in the same storage media and to delete the volume where the data are not stored.

13. The computer system according to claim 9, wherein when the information of a growth state of the pool indicates growth completion when migrating the data of the pool to the storage tiers to be newly created for which the creation instruction has been issued to the storage apparatus, the control unit for the management computer is configured to migrate data of an allocated capacity of the storage media with higher I/O performance than that of the storage media of the pool in descending order of the I/O frequency of the data to the storage media of a highest-level tier, and to migrate data of an allocated capacity of the storage media with lower I/O performance than that of the storage media of the pool in ascending order of the I/O frequency to the storage media of a lower-level tier.

14. The computer system according to claim 1, wherein as triggered by receipt of a notice that an allocated storage tier in which a storage area is allocated to the data storage area of the volume or volumes from the storage apparatus is short of capacity, the control unit for the management computer is configured to obtain a specified capacity to be added to the allocated storage tiers, the storage media information stored in the storage apparatus, structure information of the allocated storage tiers, and the I/O frequency distribution of data of the allocated storage tiers from the storage apparatus and to obtain a policy for adding the specified capacity to the allocated storage tiers from the host computer; to calculate a capacity of the data storage area corresponding to the I/O frequency distribution in ascending order of the I/O performance of the storage media with respect to the I/O frequency distribution of the storage tiers obtained by adding the specified capacity to the allocated storage tiers, to calculate an additional capacity by subtracting a capacity of an actual structure of the allocated storage tiers from the capacity of the storage media constituting the calculated storage tiers, and to issue instruction to the storage apparatus to create a storage tiers to which the calculated additional capacity is added.

15. The computer system according to claim 14, wherein when the capacity of the storage media with low I/O performance is less than the calculated additional capacity, the control unit for the management computer is configured to calculate the structure of the storage pier pool by allocating the capacity of the storage media with the next lower performance.

16. The computer system according to claim 15, wherein the control unit for the management computer is configured to:
  calculate an ideal capacity of each storage media equivalent to the capacity of the data storage area corresponding to the I/O frequency distribution of the storage tiers;
  calculate a ratio of the ideal capacity to the storage media with low I/O performance in the I/O frequency distribution;
  calculate the capacity of the storage tiers obtained by adding the additional capacity to the allocated storage tiers;
  calculate an ideal structural ratio of the storage tiers obtained by adding the additional capacity to the allocated storage tiers; and
  calculate an ideal additional capacity by subtracting the capacity of the actual structure of the allocated storage tiers based on the ideal structure calculated ratio.

17. The computer system according to claim 1, wherein the control unit for the storage apparatus is configured to manage a substantive real volume of another storage apparatus connected to the storage apparatus as an external volume of the storage apparatus by associating the real volume of the other storage apparatus with the volume of the storage apparatus; and
  wherein the control unit for the management computer is configured to:
    obtain the storage media information, including information of the volume of the storage apparatus and information of the external volume, and the I/O frequency distribution corresponding to the I/O frequency information of the data storage area of the volume; and
    calculate the capacity of the data storage area corresponding to the I/O frequency distribution in ascending order of the I/O performance of the storage media on the basis of the storage media information and issue an instruction to the storage apparatus to create the storage tiers by using the calculated capacity of the storage media.

18. A storage management method for a computer system comprising a storage apparatus, a host computer requesting writing of data to the storage apparatus, and a management computer for managing the storage apparatus and the host computer, wherein the storage apparatus, the host computer, and the management computer are connected to each other using a network,
  wherein the storage apparatus includes:
    a plurality of kinds of storage media with different performance; and
    a control unit configured to manage storage areas, which are provided by the plurality of kinds of storage media with the different I/O performance, as storage tiers, to allocate a specified storage area from the storage tiers to a data storage area of a volume or volumes storing the data in response to a request from the host computer to write the data, to collect I/O frequency information of the data storage area, and to provide it to the management computer;
  wherein the management computer includes:
    a storage unit configured to store a pool structure information table for managing structure information of the storage tiers; and
    a control unit configured to manage the structure of the storage tiers of the storage apparatus; and
  wherein the storage management method comprises the following steps executed, when adding a specified area of the storage media to the storage tiers in response to a request from the host computer, by the control unit of the management computer:
    obtaining storage media information, including the I/O frequency of the data storage area of the volume or volumes as well as performance information and structure information of the storage media, from the storage apparatus;
    identifying one or more storage media whose I/O performance exceeds the I/O frequency and which are not allocated to any of the volumes, on a basis of the structure information of the storage media so that the data storage area of the volume or volumes to which a specified storage area in the storage tiers is allocated will satisfy a specified I/O performance target; and
    of issuing an instruction to the storage apparatus to create the storage tiers by using the identified storage media.

* * * * *